(12) United States Patent
Nabae

(10) Patent No.: US 7,885,267 B2
(45) Date of Patent: Feb. 8, 2011

(54) NETWORK SYSTEM AND NETWORK CONNECTION DEVICE

(75) Inventor: Takehiro Nabae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 11/851,539

(22) Filed: Sep. 7, 2007

(65) Prior Publication Data

US 2007/0291649 A1 Dec. 20, 2007

Related U.S. Application Data

(63) Continuation of application No. PCT/JP2005/010798, filed on Jun. 13, 2005.

(30) Foreign Application Priority Data

Mar. 17, 2005 (JP) .................. PCT/JP2005/004775

(51) Int. Cl.
 *H04L 12/28* (2006.01)
 *H04L 12/56* (2006.01)
(52) U.S. Cl. .................. 370/395.31; 370/392
(58) Field of Classification Search .................. 370/389, 370/392, 395.3, 395.31
 See application file for complete search history.

(56) References Cited

U.S. PATENT DOCUMENTS

| 6,397,260 | B1* | 5/2002 | Wils et al. .................. 709/238 |
| 6,473,404 | B1* | 10/2002 | Kaplan et al. .................. 370/238 |
| 6,791,940 | B1* | 9/2004 | Rajesh .................. 370/219 |
| 2003/0046397 | A1* | 3/2003 | Trace et al. .................. 709/227 |
| 2003/0219019 | A1* | 11/2003 | Wilson .................. 370/395.1 |
| 2004/0215609 | A1* | 10/2004 | Takatsu et al. .................. 707/3 |
| 2005/0278784 | A1* | 12/2005 | Gupta et al. .................. 726/23 |

FOREIGN PATENT DOCUMENTS

| JP | 11-112570 | 4/1999 |
| JP | 2002-281067 | 9/2002 |
| JP | 2002-359638 | 12/2002 |
| JP | 2004-088658 | 3/2004 |

OTHER PUBLICATIONS

International Search Report dated Aug. 30, 2005, from corresponding International Application No. PCT/JP2005 /010798.
International Search Report dated May 31, 2005, from corresponding International Application No. PCT/JP2005 /004775.
Satoshi Shimizu "Name Solution is First Step to Communications, Path Selection also Possible" Nikkei Byte, vol. 228, Apr. 22, 2002, pp. 138-143 (partial translation attached).

* cited by examiner

*Primary Examiner*—Ronald Abelson
(74) *Attorney, Agent, or Firm*—Fujitsu Patent Center

(57) ABSTRACT

There are provided a network system and a network connection device which are adapted for handling a plurality of default routes. The network system includes a plurality of network connection devices, and each network connection device is configured to associate each of one or more default routes with an identifier respectively, enabling setting of one or more default routes by the association.

28 Claims, 40 Drawing Sheets host 21 : ⟶
host 22 : - - -▶ host 21　　host 22
10.1.1.50　10.1.1.100

Access list　　　　permit
host 22 (10.1.1.100)　⟵⟶　1.0.0.0/8
　　　　　　　　　　　　　2.0.0.0/8
　　　　　　　　　　　　　3.0.0.0/8
　　　　　　　　　　　　　⋮
　　　　　　　　　　　　　255.0.0.0/8

FIG.5

| DESTINATION SEGMENT | DESTINATION (NEXT ROUTER) | USE SEGMENT | IDENTIFIER |
|---|---|---|---|
| SEGMENT B | ROUTER B | | |
| SEGMENT C | ROUTER C | | |
| SEGMENT D | ROUTER D | | |
| SEGMENT E | ROUTER E | | |
| DEFAULT ROUTE | — | — | 001 |

FIG.6

ETHERNET FRAME (IPV4)

| DESTI-NATION MAC ADDRESS (6 BYTES) | SOURCE MAC ADDRESS (6 BYTES) | FRAME TYPE (2 BYTES) | IPV4 HEADER (28 BYTES) | TCP HEADER (20 BYTES) | DATA LENGTH (0~1452 BYTES) | FCS (4 BYTES) |

FIG.7

ETHERNET FRAME (IPV6)

| DESTI-NATION MAC ADDRESS (6 BYTES) | SOURCE MAC ADDRESS (6 BYTES) | FRAME TYPE (2 BYTES) | IPV6 HEADER (40 BYTES) | IPV6 EXTEND-ED HEADER (8 BYTES) | TCP HEADER (20 BYTES) | DATA LENGTH (0-1432 BYTES) | FCS (4 BYTES) |

| DESTINATION SEGMENT | DESTINATION (NEXT ROUTER) | USE SEGMENT (NEW FUNCTION) | IDENTIFIER |
|---|---|---|---|
| SEGMENT A | ROUTER A | | |
| SEGMENT C | ROUTER C | | |
| SEGMENT D | ROUTER D | | |
| SEGMENT E | ROUTER E | | |
| DEFAULT ROUTE | ROUTER A | — | 001 |

| DESTINATION SEGMENT | DESTINATION (NEXT ROUTER) | USE SEGMENT (NEW FUNCTION) | IDENTIFIER |
|---|---|---|---|
| SEGMENT A | ROUTER C | | |
| SEGMENT B | ROUTER B | | |
| SEGMENT C | ROUTER C | | |
| SEGMENT E | ROUTER E | | |
| DEFAULT ROUTE | ROUTER C | — | 001 |

FIG.16

| IDENTIFIER 901 | — | C | SEGMENT 1 | NO BROADCAST |
| IDENTIFIER 902 | — | B | SEGMENT 2 | NO BROADCAST |
| IDENTIFIER 903 | — | E | SEGMENT 3 | NO BROADCAST |
| IDENTIFIER 904 | — | E | ALL | NO BROADCAST |

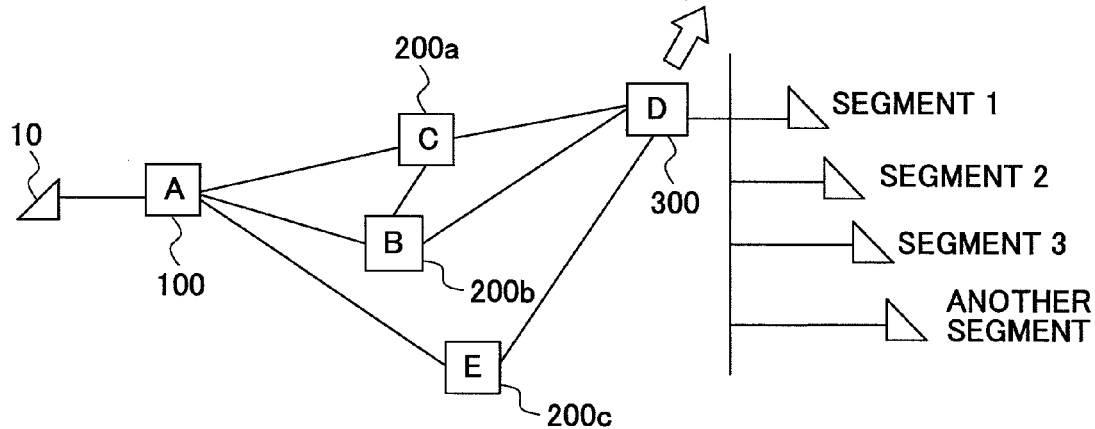

FIG.17

| DESTINATION SEGMENT | DESTINATION (NEXT ROUTER) | USE SEGMENT (NEW FUNCTION) | IDENTIFIER |
|---|---|---|---|
| SEGMENT A | ROUTER C | | |
| SEGMENT B | ROUTER B | | |
| SEGMENT C | ROUTER C | | |
| SEGMENT E | ROUTER E | | |
| DEFAULT ROUTE | ROUTER C | SEGMENT 1 | 901 |
| DEFAULT ROUTE | ROUTER B | SEGMENT 2 | 902 |
| DEFAULT ROUTE | ROUTER E | SEGMENT 3 | 903 |
| DEFAULT ROUTE | ROUTER E | ALL | 904 |

| DESTINATION SEGMENT | DESTINATION (NEXT ROUTER) | USE SEGMENT (NEW FUNCTION) | IDENTIFIER |
|---|---|---|---|
| SEGMENT A | ROUTER C | | |
| SEGMENT B | ROUTER B | | |
| SEGMENT C | ROUTER C | | |
| SEGMENT E | ROUTER E | | |
| DEFAULT ROUTE | ROUTER B | SEGMENT 1 | 001 |
| DEFAULT ROUTE | ROUTER C | SEGMENT 2 | 002 |
| DEFAULT ROUTE | ROUTER E | ALL | 901 |

| IDENTIFIER 001 | 15:00:12 | B | SEGMENT 1 | — | DETOUR |
| IDENTIFIER 002 | 15:00:30 | E | SEGMENT 2 | — | DETOUR |
| IDENTIFIER 901 | — | C | ALL | NO BROADCAST | — |

| SEGMENT NAME | DEFAULT_1 | DEFAULT_2 |
|---|---|---|
| SEGMENT 1 | IDENTIFIER 001 | IDENTIFIER 002 |
| SEGMENT 2 | IDENTIFIER 002 | IDENTIFIER 001 |
| ALL | IDENTIFIER 901 | — |

FIG.28

| DESTINATION SEGMENT | DESTINATION (NEXT ROUTER) | USE SEGMENT (NEW FUNCTION) | IDENTIFIER | DETOUR |
|---|---|---|---|---|
| SEGMENT A | ROUTER C | | | |
| SEGMENT B | ROUTER B | | | |
| SEGMENT C | ROUTER C | | | |
| SEGMENT E | ROUTER E | | | |
| DEFAULT ROUTE | ROUTER B | SEGMENT 1 | 001 | YES |
| DEFAULT ROUTE | ROUTER E | SEGMENT 2 | 002 | YES |
| DEFAULT ROUTE | ROUTER C | ALL | 901 | |

FIG.34

| ITEM | DESTINATION | NEXT HOP |
|---|---|---|
| 1 | 10.0.0.0/8 | 211.10.1.1 (PE5) |
| 2 | 10.3.1.0/24 | 10.3.1.2 (L2-SW#a) |
| 3 | 10.3.2.0/24 | 10.3.2.2 (L2-SW#b) |
| 4 | 0.0.0.0/0 | 211.10.1.1 (PE5) |

FIG.36

| ITEM | USE SEGMENT | IDENTIFIER |
|---|---|---|
| a | 10.3.1.0/24 | 001 |
| b | 10.3.2.0/24 | 002 |

FIG.37

| ITEM | DESTINATION | NEXT HOP | IDENTIFIER |
|---|---|---|---|
| 1 | 10.0.0.0/8 | 211.10.1.1 (PE5) | — |
| 2 | 10.3.1.0/24 | 10.3.1.2 (L2-SW#a) | — |
| 3 | 10.3.2.0/24 | 10.3.2.2 (L2-SW#b) | — |
| 4 | 0.0.0.0/0 | 211.10.1.1 (PE5) | 001 |
| 5 | 0.0.0.0/0 | 211.10.1.1 (PE5) | 002 |

FIG.39

| ITEM | USE SEGMENT | IDENTIFIER |
|---|---|---|
| a | 10.3.1.0/24 | 001 |
| b | 10.3.2.0/24 | 901 |

FIG.40

| ITEM | DESTINATION | NEXT HOP | IDENTIFIER |
|---|---|---|---|
| 1 | 10.0.0.0/8 | 211.10.1.1 (PE5) | — |
| 2 | 10.3.1.0/24 | 10.3.1.2 (L2-SW#a) | — |
| 3 | 10.3.2.0/24 | 10.3.2.2 (L2-SW#b) | — |
| 4 | 0.0.0.0/0 | 211.10.1.1 (PE5) | 001 |
| 5 | 0.0.0.0/0 | 230.40.1.2 (Internet B) | 901 |

FIG.42

| IDENTIFIER | IP ADDRESS |
|---|---|
| 001 | ROUTER A |

FIG.43

| DESTINATION SEGMENT | DESTINATION (NEXT ROUTER) | USE SEGMENT (NEW FUNCTION) | IDENTIFIER |
|---|---|---|---|
| SEGMENT A | ROUTER C | | |
| SEGMENT B | ROUTER B | | |
| SEGMENT C | ROUTER C | | |
| SEGMENT E | ROUTER E | | |
| DEFAULT ROUTE | ROUTER A | — | 001 |

FIG.48

| DESTINATION SEGMENT | DESTINATION (NEXT ROUTER) | USE SEGMENT (NEW FUNCTION) | IDENTIFIER | DETOUR |
|---|---|---|---|---|
| SEGMENT A | ROUTER C | | | |
| SEGMENT B | ROUTER B | | | |
| SEGMENT C | ROUTER C | | | |
| SEGMENT E | ROUTER E | | | |
| DEFAULT ROUTE | ROUTER A | SEGMENT 1 | 001 | YES |
| DEFAULT ROUTE | ROUTER E | SEGMENT 2 | 002 | YES |
| DEFAULT ROUTE | ROUTER B | ALL | 901 | |

DEFAULT CONVERSION DATA PACKET (IN CASE OF IPV4)

FIG.52

| ITEM | USE SEGMENT | IDENTIFIER |
|---|---|---|
| a | 10.3.1.0/24 | 001 |
| b | 10.3.2.0/24 | 002 |

FIG.53

| ITEM | DESTINATION | NEXT HOP | IDENTIFIER |
|---|---|---|---|
| 1 | 10.0.0.0/8 | 211.10.1.1 (PE5) | — |
| 2 | 10.3.1.0/24 | 10.3.1.2 (L2-SW#a) | — |
| 3 | 10.3.2.0/24 | 10.3.2.2 (L2-SW#b) | — |
| 4 | 0.0.0.0/0 | 211.1.1.2 (L3-SW#1) | 001 |
| 5 | 0.0.0.0/0 | 211.4.1.2 (L3-SW#4) | 002 |

NETWORK SYSTEM AND NETWORK CONNECTION DEVICE

CROSS-REFERENCE TO RELATED APPLICATION

This application is a U.S. continuation application which is filed under 35 USC 111(a) and claims the benefit under 35 USC 120 and 365(c) of International Application No. PCT/JP2005/010798, filed on Jun. 13, 2005, which is based on and claims the benefit of priority of International Application No. PCT/JP2005/004775, filed on Mar. 17, 2005, the entire contents of which are hereby incorporated by reference.

BACKGROUND OF THE INVENTION

1. Field of the Invention

This invention relates to a network system and a network connection device, and in particular to a network system and a network connection device in which default routes are set up.

2. Description of the Related Art

In a general routing technique, the routing mechanism taken for a network connection device, such as a router, is that, if a next hop does not exist in a routing table of the network connection device, data packets are transmitted according to a default route. The default route is a predetermined destination for the network connection device and it is expressed by "0.0.0.0 to next hop" for example.

Japanese Laid-Open Patent Application No. 2002-359638 discloses a method of controlling a router system to ensure that a default route is always set in a routing table.

However, a default route is the only one piece of routing information that can be set up in a certain network. Namely, it has been handled so that one default route in a network is recognized in common. Therefore, it has been impractical that a plurality of default routes be set up for every network connection device or every segment of a certain base.

To solve the problem that a plurality of default routes cannot be set up, a method of the policy routing is used in a conventional network connection device. The policy routing is the routing mechanism in which both a transmission source address and a destination address are checked to specify a destination route and data packets are transmitted to the target destination.

However, the method of policy routing has the following problems. The first problem of policy routing is that the number of routes that can be set up depends on the performance of a network connection device and it is limited. The second problem of policy routing is that the manner of setting routes is complicated and difficult. For example, in a case of Internet connection, describing all the global addresses which exist in the world will be needed for the method of policy routing and a large amount of setting information will be needed. This makes the management of the configuration information complicated.

The third problem of policy routing is that, when the necessity of setting addition or deletion occurs, the setting modification work for all the network connection devices has to be carried out.

SUMMARY OF THE INVENTION

According to one aspect of the invention, there is provided an improved network system and network connection device in which the above-described problems are eliminated.

According to one aspect of the invention, there is provided a network system and network connection device which is adapted for handling a plurality of default routes.

In an embodiment of the invention which solves or reduces one or more of the above-mentioned problems, there is provided a network system including a plurality of network connection devices, each network connection device configured to associate, when a destination of a received packet does not exist in a routing table, a default route indicating a destination to which the received packet is transmitted, with an identifier, and configured to set one or more default routes by the association.

In the network system of the invention, setting of a plurality of default routes in the same network is enabled, and management and maintenance of the routing table can be carried out easily, so that drastic TCO (total cost of ownership) reduction can be realized.

According to the invention, it is possible to provide a network system and a network connection device capable of handling a plurality of default routes.

BRIEF DESCRIPTION OF THE DRAWINGS

FIG. 5 is a diagram showing an example of a routing table to which a default route is added.

FIG. 6 is a diagram showing an example of Ethernet frame according to IPv4.

FIG. 7 is a diagram showing an example of Ethernet frame according to IPv6.

FIG. 16 is a diagram showing an example of a network model for explaining an addition procedure of a default route.

FIG. 17 is a diagram showing an example of a routing table to which a default route is added.

FIG. 28 is a diagram showing an example of a routing table in which a default route of each segment is set.

FIG. 34 is a diagram showing an example of a routing table of a switch (L3-SW#3) of base C.

FIG. 36 is a diagram showing an example of the information which is managed by a default route management unit of a switch (L3-SW#3) of base C.

FIG. 37 is a diagram showing an example of a routing table of the switch (L3-SW#3) of base C.

FIG. 39 is a diagram showing an example of the information which is managed by the default route management unit of the switch (L3-SW#3) of base C.

FIG. 40 is a diagram showing an example of a routing table of the switch (L3-SW#3) of base C.

FIG. 42 is a diagram showing an example of a table which is managed by a default route management unit.

FIG. 43 is a diagram showing an example of a routing table to which a default route is added.

FIG. 48 is a diagram showing an example of a routing table in which a default route of each segment is set.

FIG. 52 is a diagram showing an example of the information which is managed by the default route management unit of a switch (L3-SW#3) of base C.

FIG. 53 is a diagram showing an example of a routing table of the switch (L3-SW#3) of base C.

DETAILED DESCRIPTION OF PREFERRED EMBODIMENTS

A description will now be given of an embodiment of the invention with reference to the accompanying drawings.

To facilitate an understanding of the invention, the principle of the invention will be described. In an embodiment of the invention, an identifier is provided for a default route, which enables handling of a plurality of default routes in a network.

Namely, it is possible for an embodiment of the invention to handle a plurality of default routes in the same network. In the embodiment of the invention, use of arbitrary one of a plurality of default routes is possible for every base or for every segment of a base, and the above-mentioned problems of the related art can be solved.

Figure 1:
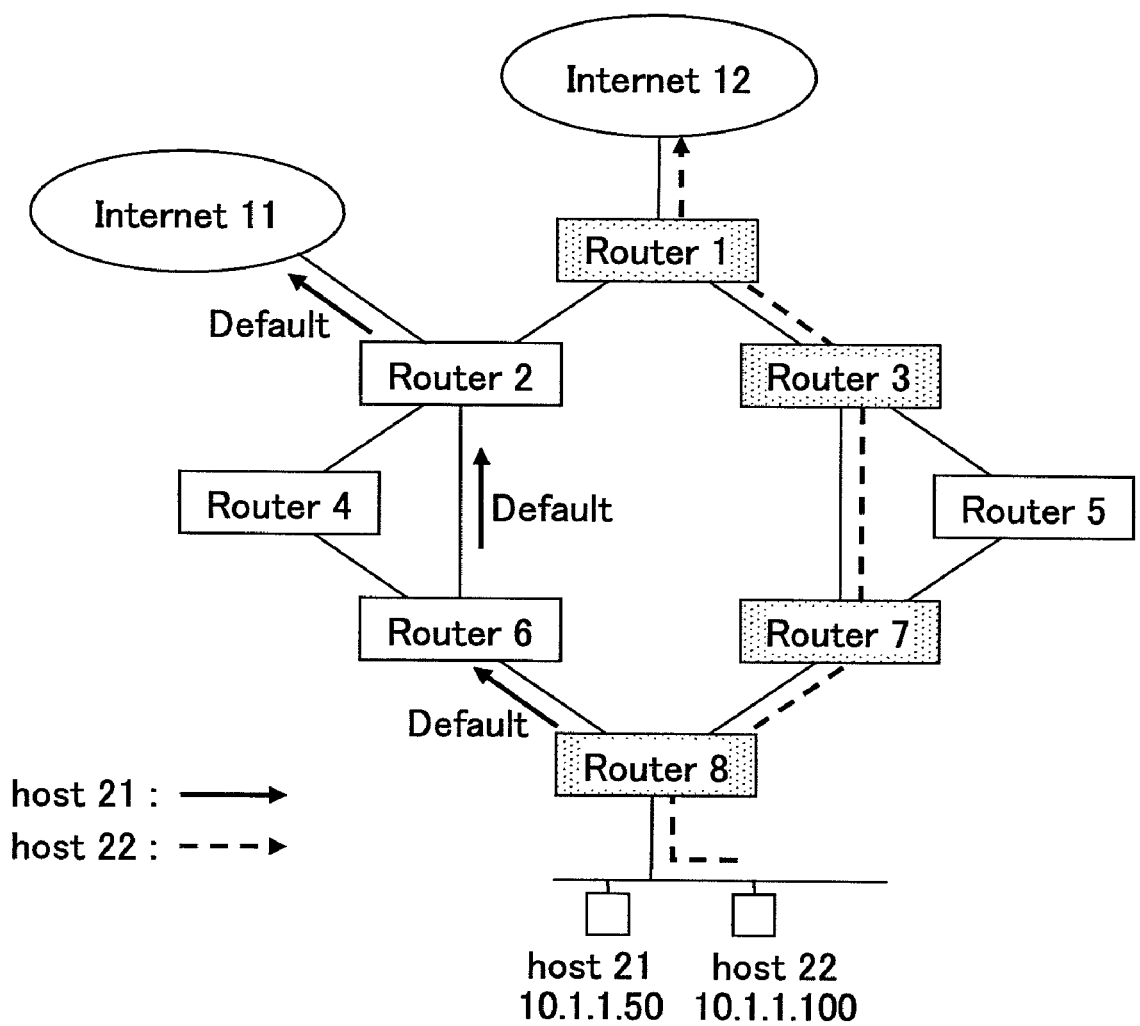
FIG. 1 is a diagram for explaining a routing technique according to the related art.
Figures 2, 3:
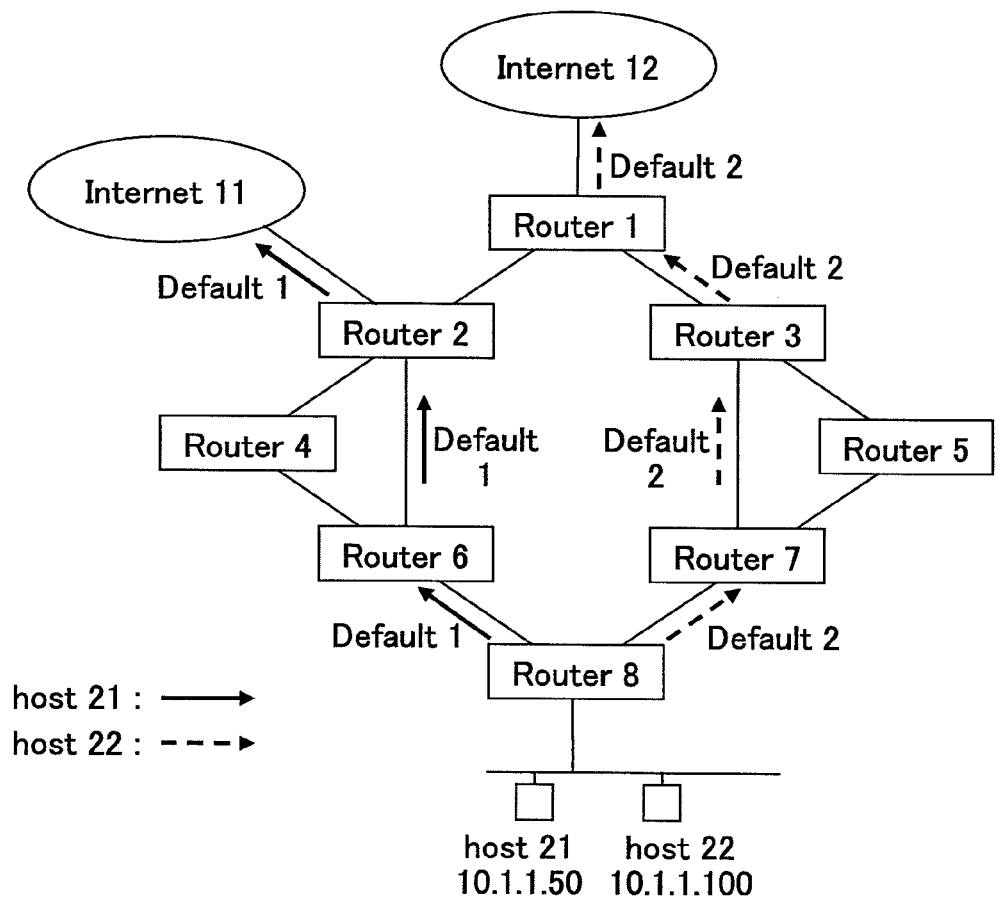
FIG. 2 is a diagram for explaining a routing technique according to the invention.
FIG. 3 is a diagram showing an example of policy setting conditions.

Next, a description will be given of the comparison between the invention and the related art with reference to FIG. 1 and FIG. 2. FIG. 1 is a diagram for explaining a routing technique according to the related art. FIG. 2 is a diagram for explaining a routing technique according to the invention.

Generally when a plurality of outlets of the Internet are installed in a network using IP-VPN etc., a default route is set for the 1st one of the outlets of the Internet, and the policy routing is used for the 2nd or subsequent ones of the outlets of the Internet.

In the policy routing in this case, a conversion table must be prepared in which the transmission source address, the destination address, and the destination router, with respect to the routers of all the paths which cover the router of the connection source and the router of the transmission destination at the outlet of the Internet, are associated together. And in the policy routing, when a transmission source address and a destination address match the corresponding ones of the conversion table, the received packet is transmitted to a predetermined destination router.

The number of nodes in the network of FIG. 1 is equal to 8 (routers 1-8). Router 1 is connected to Internet 12. Router 2 is connected to Internet 11. The default route is set for Internet 11. The default route of all the routers 1-8 in the network is set for Internet 11. Router 2 distributes the default route information indicating the default route to other routers in the network.

Unless otherwise specified, any host in the network which is intended to perform Internet communication is connected to Internet 11. For example, host 21 is connected to Internet 11. When it is intended to connect a specific terminal (for example, host 22) in the network to Internet 12, the above-mentioned policy routing is used.

When the policy routing is used, the policy setting conditions, as shown in FIG. 3, are needed for each of the four routers between the paths from router 8 to router 1 (router 8, router 7, router 3, and router 1). FIG. 3 shows an example of the policy setting conditions. By using the policy setting conditions of FIG. 3, the information about the global addresses (1.0.0.0/8-255.0.0.0/8) is transmitted from host 22 to the set-up destination router.

For example, router 8 transmits the packet to router 7 when the policy setting conditions are met. Router 7 transmits the packet to router 3 when the policy setting conditions are met. Router 3 transmits the packet to router 1 when the policy setting conditions are met. Router 1 transmits the packet to Internet 12 when the policy setting conditions are met.

When there are two or more outlets of the Internet as shown in FIG. 1, the policy setting conditions are needed for every path. That is, in the method of policy routing, the policy setting conditions for all the paths including the router of the transmission source to the router of the outlet of the Internet which is the connection destination are needed at the time of network construction for every host or every segment. For example, it is necessary to set the policy setting conditions including about 250 global addresses from the transmission source to the connection destination.

Moreover, after the time of network construction, in the case of the policy routing, when performing addition of new segments to the network or deletion of the existing segments and performing addition or deletion of the outlet of the Internet, the work for the addition or deletion of the policy setting conditions must be done for all the paths from the router of the transmission source to the router of the outlet of the Internet which is the connection destination.

Moreover, the method of policy routing has a problem in that the addition/deletion work of the policy setting conditions increases proportionally as the size of the network increase, and the network management and maintenance cost becomes very large.

In contrast, in the routing technique according to the invention, setting of a plurality of default routes in a network is enabled by giving an identifier to each default route, although only one default route is set in the same network according to the related art. If the setting as to which outlet of the Internet is used is performed beforehand for each host at each node of the network, the addition/deletion work at the time of network construction and at the time of addition of host/segment can be reduced to the necessary and minimum amount.

In the network of FIG. 2, each of routers 1-8 in the network can determine the identifier of the default route. For example, the routing of router 8 in the network is predetermined such that when a global address connection from host 21 is received, router 8 uses the default route of identifier "1" (which will be hereafter called the default route 1), and when a global address connection from host 22 is received, router 8 uses the default route 2.

According to the routing technique of the invention, handling of a plurality of default routes in a same network is possible, and it is possible to omit the work of setting of the policy routing at the time of network construction and thereafter which had been enlarged depending on the policy routing, so that drastic TCO (total cost of ownership) reduction can be realized.

When using a plurality of default routes in a network, a router performs a broadcast of the default routes with the identifiers to the whole network, and makes all the routers in the network recognize the default routes with the identifiers. Alternatively, the individual routers may also have a plurality of default routes. For example, the router may have a plurality of default routes in the range closed to the router. In this case, the router does not perform broadcast of the default routes with the identifiers to the whole network.

Figure 4:
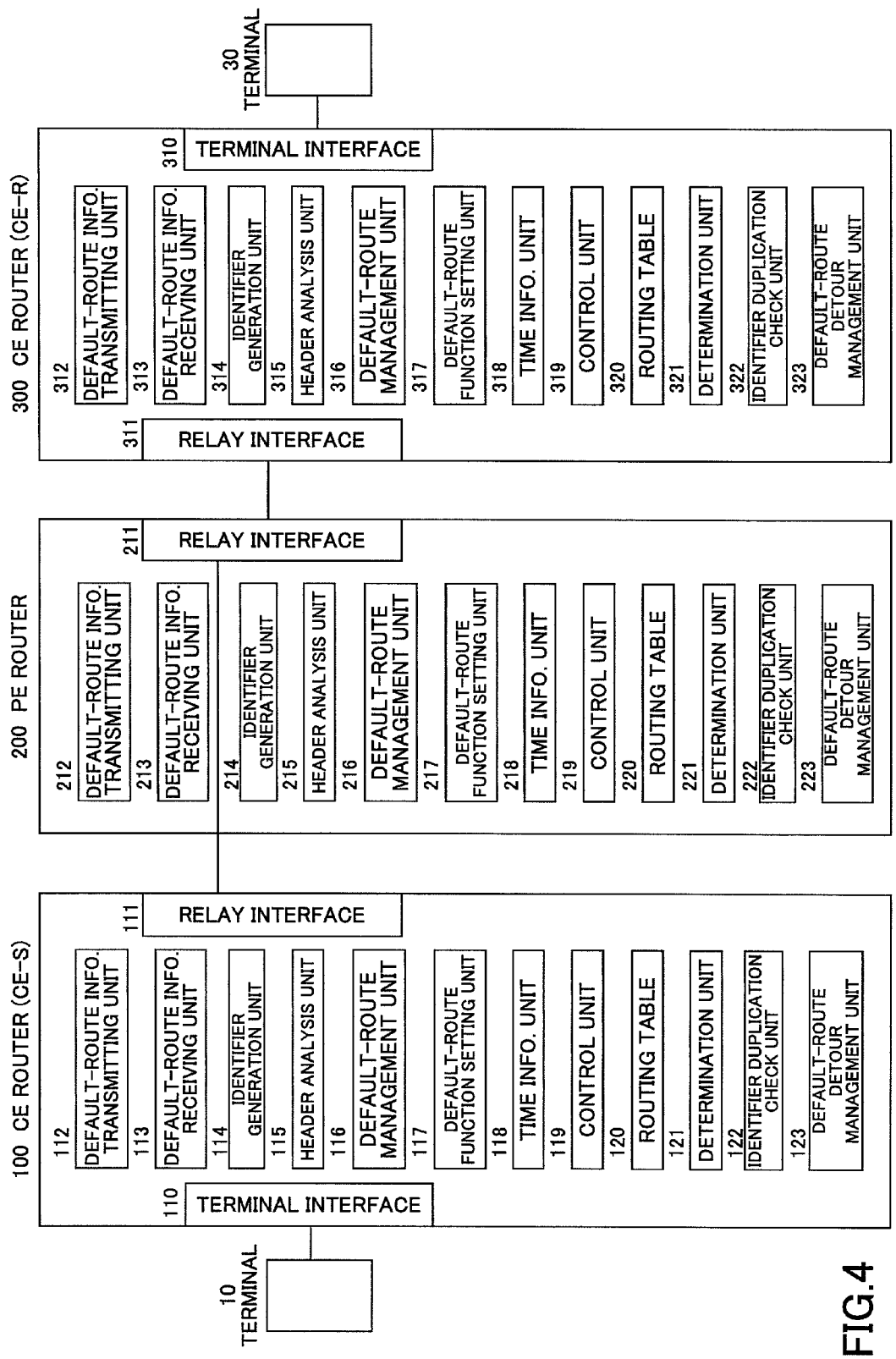
FIG. 4 is a block diagram showing the composition of a network system in an embodiment of the invention.

FIG. 4 is a block diagram showing the composition of a network system in an embodiment of the invention.

In the network system of FIG. 4, terminal 10 and terminal 30 are connected through CE (customer edge) router 100, PE (provider edge) router 200, and CE router 300.

CE router 100,300 is a router installed on the customer side, which provides an entrance to IP-VPN. PE router 200 is a router which accommodates the access line from CE router 100,300. CE router 100 accommodates terminal 10. CE router 300 accommodates terminal 30.

CE router 100 includes terminal interface 110, relay interface 111, default-route information transmitting unit 112, default-route information receiving unit 113, identifier generation unit 114, header analysis unit 115, default-route management unit 116, default-route function setting unit 117, time information unit 118, control unit 119, routing table 120, determination unit 121, identifier duplication check unit 122, and default-route detour management unit 123.

PE router 200 includes relay interface 211, default-route information transmitting unit 212, default-route information receiving unit 213, identifier generation unit 214, header analysis unit 215, default-route management unit 216, default-route function setting unit 217, time information unit 218, control unit 219, routing table 220, determination unit 221, identifier duplication check unit 222, and default-route detour management unit 223.

CE router 300 includes terminal interface 310, relay interface 311, default-route information transmitting unit 312, default-route information receiving unit 313, identifier generation unit 314, header analysis unit 315, default-route management unit 316, default-route function setting unit 317, time information unit 318, control unit 319, routing table 320, determination unit 321, identifier duplication check unit 322, and default-route detour management unit 323.

Terminal interface 110,310 is an interface for accommodating terminal 10 or terminal 30. Relay interface 111, 211, 311 is an interface for accommodating a trunk line (network side).

Default-route information transmitting unit 112, 212, 312 provides a function of transmitting default route information. For example, default-route information transmitting unit 112 transmits the default route information set up in the function of default-route function setting unit 117 to the PE router 200 and CE router 300 side.

Default-route information receiving unit 113, 213, 313 provides a function of receiving default route information. Default-route information receiving unit 213,313 receives the default route information sent out from default-route information transmitting unit 112,212.

Since a plurality of default routes will exist in the same network, identifier generation unit 114, 214, 314 provides a function of generating an identifier (identification number) given for every default route so that it may not mix up.

Identifier generation unit 114, 214, 314 also has the function to store generating time information (dispatch time information which shows when it sent), when disseminating default route information.

Header analysis unit 115, 215, 315 provides a function of reading the information, including the identifier of default route, the generating time information, etc., contained in the packet header. Header analysis unit 215,315 of PE router 200 or CE router 300 of the receiving side reads the information, including the identifier of default route, generating time information, etc., contained in the packet header.

Since there is a case in which default route information is transmitted by or received at a plurality of routers in the same network, default route management unit 116, 216, 316 provides a function of managing a default route for every router.

The information managed by default route management unit 116, 216, 316 includes each default route information, the identifier associated with the default route, the receiving time information, and the transmission source information indicating from which router the default route information is transmitted.

The default route information managed by default route management unit 116, 216, 316 is transmitted to routing table 120, 220, 320, and it is managed by each routing table 120, 220, 320.

Default route function setting unit 117, 217, 317 provides a function of setting up how a plurality of items of default route information managed by default route management unit 116, 216, 316 are used for every router or every segment.

CE router 100, PE router 200, and CE router 300 transmit default route information according to the setting of default function setting unit 117, 217, 317. The default route information and the identifier are sent to the router in the network according to the setting of default route function setting unit 117, 217, 317.

When time information unit 118, 218, 318 receives default route information, it provides a function of storing receiving time information. Control unit 119, 219, 319 performs control of the entire CE router 100, the entire PE router 200, or the entire CE router 300.

In routing table 120, 220, 320, the information of a plurality of default routes, in addition to the existing routing information are managed. Determination unit 121, 221, 321 provides a function of deleting the overlapping, subsequently received default route when the default route having the same identifier is received.

Identifier duplication check unit 122, 222, 322 provides a function of determining whether there is any duplication of the identifier of the default route in the network, so that no duplicate default route exists.

Default-route detour management unit 123, 223, 323 provides a function of predetermining the 1st priority level, the 2nd priority level, ..., the n-th priority level of the default routes for every segment (which are set up in the configuration information of the device for example). When using the default route of the 1st priority level is impossible due to a network node failure, it provides a function of making the default route of the 2nd priority level to a bypass route automatically.

Figure 41:
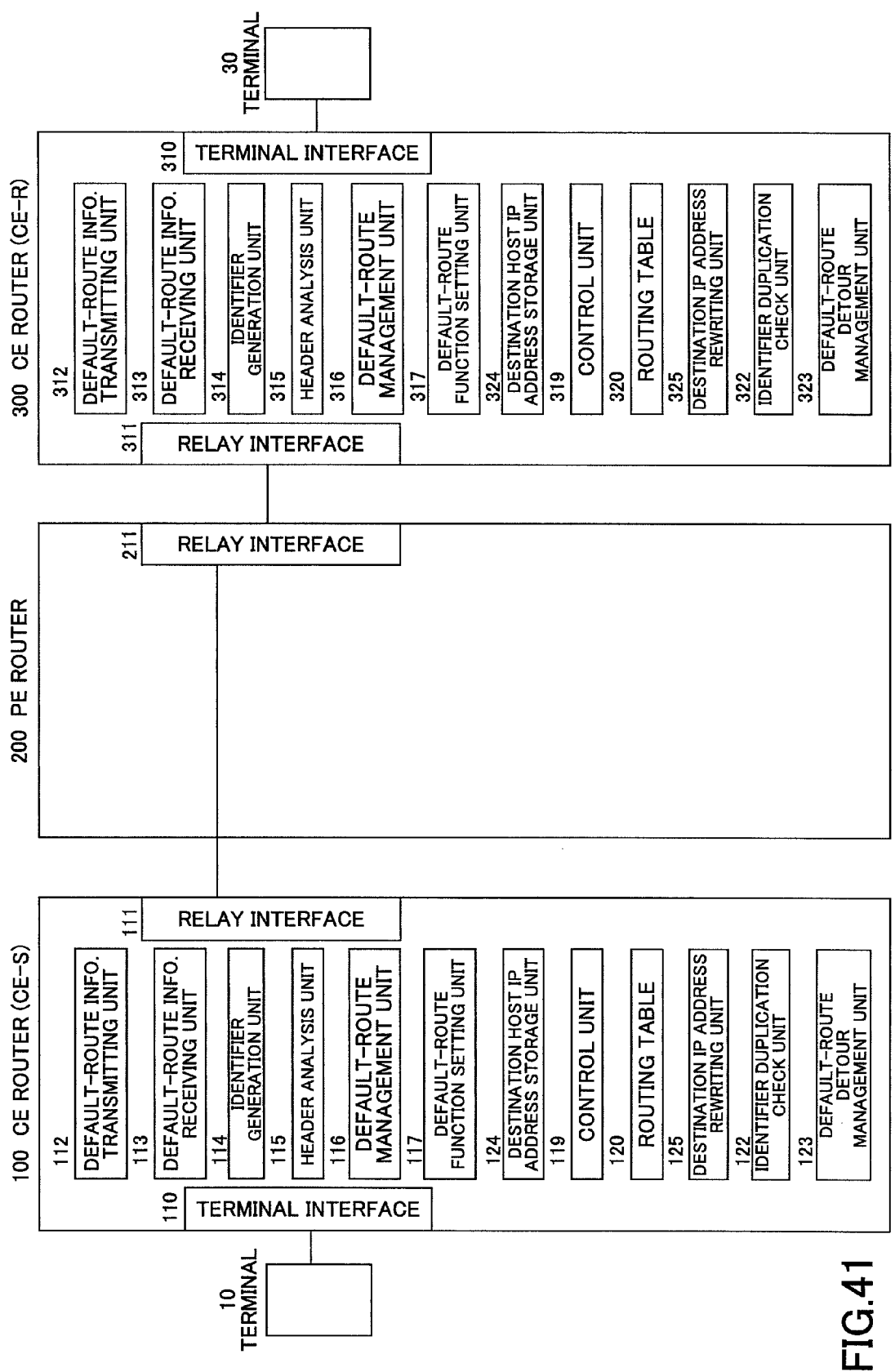
FIG. 41 is a block diagram showing the composition of a network system in an embodiment of the invention.

FIG. 41 is a block diagram showing the composition of a network system in another embodiment of the invention. The composition of the network system of FIG. 41 is essentially the same as the composition of the network system of FIG. 4 except some points, and a duplicate description will be omitted suitably.

Similar to the network system of FIG. 4, terminal 10 and terminal 30 are connected to the network system of FIG. 41 through CE router 100, PE router 200, and CE router 300.

CE router 100 includes terminal interface 110, relay interface 111, default route information transmitting unit 112, default route information receiving unit 113, identifier generation unit 114, header analysis unit 115, default route management unit 116, default route function setting unit 117, control unit 119, routing table 120, identifier duplication check unit 122, default route detour management unit 123, destination host IP address storage unit 124, and destination IP address rewriting unit 125.

PE router 200 includes relay interface 211 only. CE router 300 includes terminal interface 310, relay interface 311, default route information transmitting unit 312, default route information receiving unit 313, identifier generation unit 314, header analysis unit 315, default route management unit 316, default route function setting unit 317, control unit 319, routing table 320, identifier duplication check unit 322, default route detour management unit 323, destination host IP address storage unit 324, and destination IP address rewriting unit 325.

CE router 100 of FIG. 41 differs from CE router 100 of FIG. 4 in that, instead of time information unit 118 and determination unit 121, it includes destination host IP address storage unit 124 and destination IP address rewriting unit 125. In FIG. 41, the elements which are the same as corresponding elements in FIG. 4 are designated by the same reference numerals, and a description thereof will be omitted suitably.

PE router 200 of FIG. 41 differs from PE router 200 of FIG. 4 in that it does not include default-route information transmitting unit 212, default-route information receiving unit 213, identifier generation unit 214, header analysis unit 215, default-route management unit 216, default-route function setting unit 217, time information unit 218, control unit 219, routing table 220, determination unit 221, identifier duplication check unit 222, and default-route detour management unit 223. In FIG. 41, the elements which are the same as corresponding elements in FIG. 4 are designated by the same reference numerals, and a description thereof will be omitted suitably.

CE router 300 of FIG. 41 differs from CE router 300 of FIG. 4 in that, instead of time information unit 318 and determination unit 321, it includes destination host IP address storage unit 324 and destination IP address rewriting unit 325. In FIG. 41, the elements which are the same as corresponding elements in FIG. 4 are designated by the same reference numerals, and a description thereof will be omitted suitably.

Since a plurality of default routes will exist in the same network, identifier generation unit 114,314 provides a function of generating an identifier (identification number) given for every default route so that it may not mix up.

Header analysis unit 115,315 provides a function of reading the information, including the identifier of default route etc., contained in the packet header. Header analysis unit 315 of CE router 300 of the receiving side reads the information, including the identifier of default route etc., contained in the packet header.

Since there is a case in which default route information is transmitted by or received at a plurality of routers in the same network, default route management unit 116,316 provides a function of managing a default route for every router.

The information managed by default route management unit 116,316 includes each default route information, the identifier associated with the default route, and the transmission source information indicating from which router the information is transmitted.

Destination host IP address storage unit 124,324 stores a destination host IP address in the option part of the header, when the destination host IP address from terminal 10 or 30 is the communication using default route management unit 116, 316.

Destination IP address rewriting unit 125,325 rewrites, when the communication from terminals 10 and 30 is the communication using default route management unit 116, 316, the destination IP address of the header by the destination IP address (for example, IP address of CE router 100, 300) associated with the identifier managed by default route management unit 116,316.

Destination IP address rewriting unit 125,325 rewrites the destination IP address of the header by the destination host IP address stored in the option part of the header, when the communication to terminals 10 and 30 is the communication using default route management unit 116,316.

Next, a description will be given of an embodiment of the invention. In this embodiment, a case in which default routes are notified and applied to PE router 200 and CE router 300 (the routers which receive the default routes) by CE router 100 (the router which performs broadcast of the default routes) will be explained.

When the setting of default routes (for example, each default route is manually inputted by using the command function) is manually performed by using the function of default route function setting unit 117 according to the instruction of control unit 119, CE router 100 manages each default route as a new default route by using the function of default route management unit 116.

At this time, CE router 100 is capable of selecting one of the choice of performing broadcast of the new default route to the network and the choice of not performing the broadcast according to the manual setup of default route function setting unit 117. When the choice of performing broadcast of the new default route to the network is selected, CE router 100 operates as follows.

The identifier generation unit 114 generates a new identifier and notifies the new identifier to the default route management unit 116.

At this time, the identifier duplication check unit 122 determines whether there is any duplication of the new identifier generated by identifier generation unit 114 in the same network, by reference to the information of the default route management unit 116.

If there is any duplication, the identifier duplication check unit 122 performs incrementing of the identifier until there is no duplication of the identifier in the same network. By this operation, the identifier which is not duplication and becomes independent in the network is sent to the default route management unit 116.

The default route management unit 116 links each default route with the identifier which is independent in the network, and manages the same. The default route management unit 116 performs addition of the new default route to the routing table 120, as shown in FIG. 5.

FIG. 5 shows an example of the routing table to which a new default route is added.

In the routing table of FIG. 5, the default route of identifier "001" (which will be hereafter called the default route 001) is added. Segments B-E indicate the segments connected to the router B-E, respectively.

Subsequently, the control unit 119 controls the default-route information transmitting unit 112 to notify the new default route to the same network. The default-route information transmitting unit 112 performs broadcast transmission of the default route information to the network by using an Ethernet (registered trademark) frame according to IPv4 or IPv6.

Figure 8:
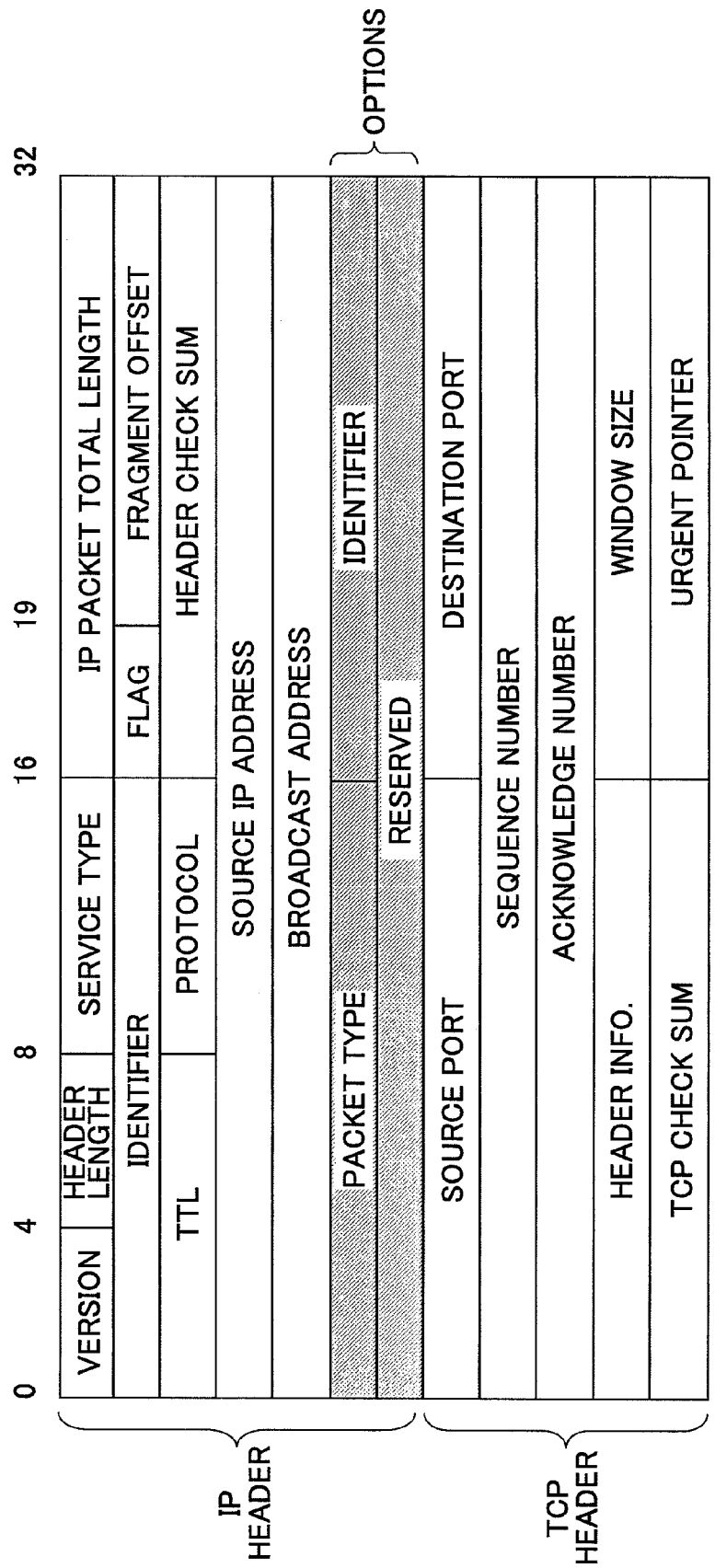
FIG. 8 is a diagram showing an example of IPv4 header and TCP header contained in Ethernet frame according to IPv4.
Figure 9:
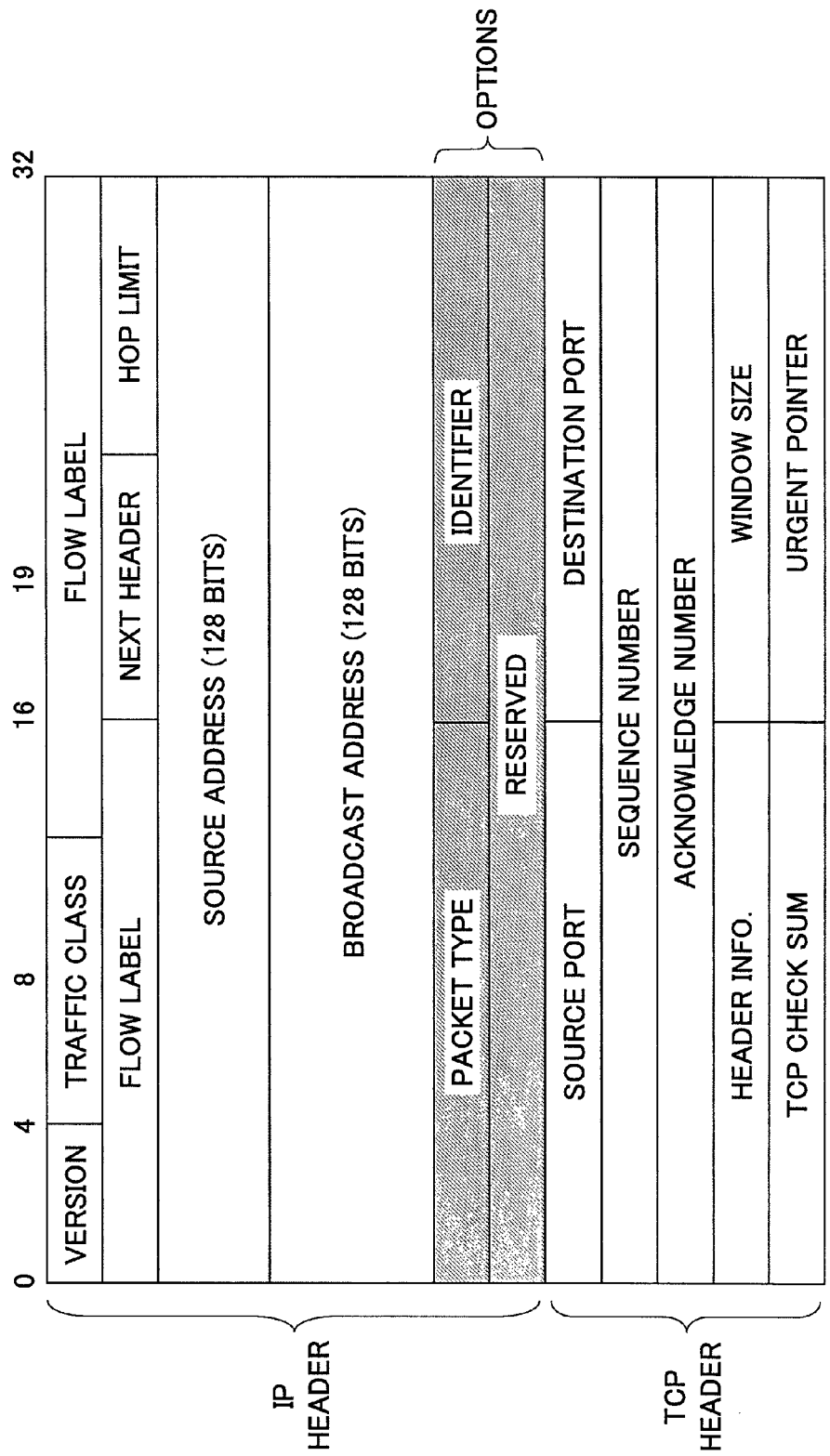
FIG. 9 is a diagram showing an example of IPv6 header and TCP header contained in Ethernet frame according to IPv6.

FIG. 6 shows an example of the Ethernet frame according to IPv4. FIG. 7 shows an example of the Ethernet frame according to IPv6. FIG. 8 shows an example of IPv4 header and TCP header contained in the Ethernet frame according to IPv4. FIG. 9 shows an example of IPv6 header and TCP header contained in the Ethernet frame according to IPv6.

As shown in FIG. 8 and FIG. 9, the default-route information transmitting unit 112 stores a packet type, an identifier and generating time (not shown), into the option part of IPv4 header or IPv6 header.

The packet type is the information for identifying a default route information packet or a data packet. The identifier is the information for identifying a plurality of default routes.

Default-route information transmitting unit 112 sets up a broadcast address as a destination address of IPv4 header or IPv6 header.

Next, how a default route is notified to the network by CE router 100 in the network system of FIG. 4 will be explained.

CE router 100 generates a default route and transmits the default route information to all the routers (the relay interface 111 in FIG. 4) by broadcasting by using the function of the default-route information transmitting unit 112.

The default-route information transmitting unit 112 transmits the new default route to PE router 200 through relay interface 111.

PE router 200 receives the default route information from CE router 100 by using the function of the default route information receiving unit 213 through the relay interface 211.

Next, the addition procedure of a default route will be described with reference to an example of the network model of FIG. 10.

Figure 10:
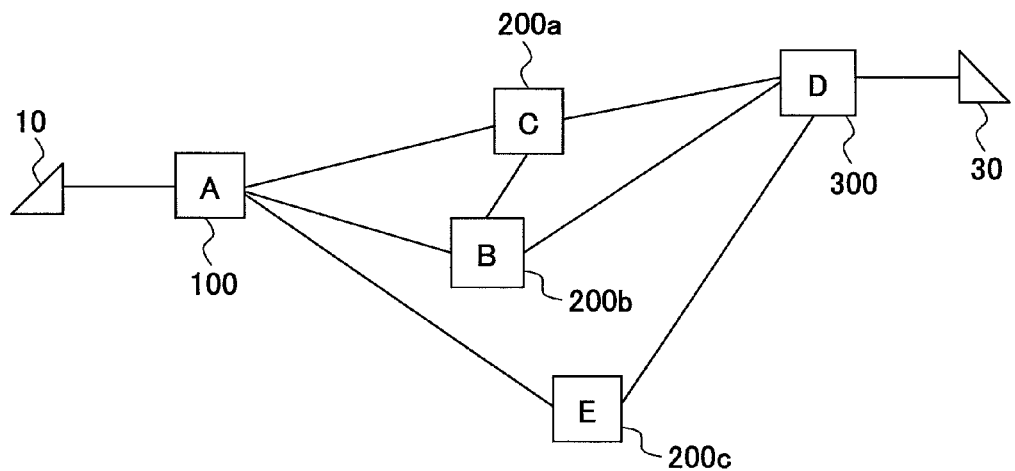
FIG. 10 is a diagram showing an example of a network model for explaining an addition procedure of a default route.

The network model of FIG. 10 has the composition in which the PE router 200 in the network system of FIG. 4 is replaced by a plurality of PE routers 200*a*-200*c*.

Figure 11:
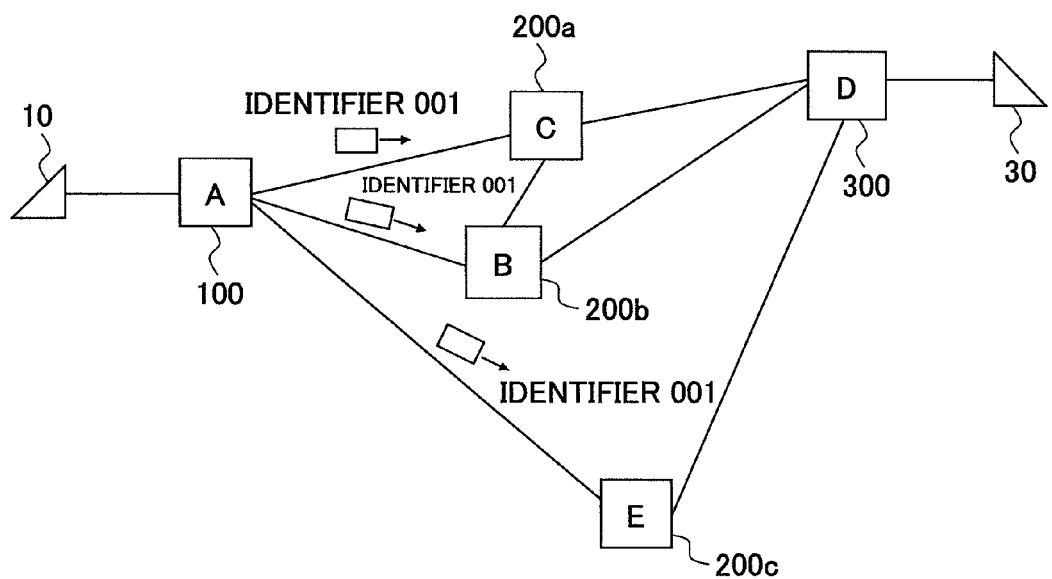
FIG. 11 is a diagram showing an example in which a new default route is transmitted from CE router to PE router.

CE router 100 transmits a new default route from the default route information transmitting unit 112 through the relay interface 111 to the PE routers 200*a*-200*c*, as shown in FIG. 11.

FIG. 11 shows an example in which a new default route is transmitted from CE router to PE router.

In the example of FIG. 11, default route 001 is transmitted to the PE routers 200*a*-200*c*. In each of the PE routers 200*a*-200*c*, the function of default route information receiving unit 213 is used to receive the default route information through the relay interface 211.

In each of the PE routers 200*a*-200*c*, the function of header analysis unit 215 is used according to the instruction of control unit 219 to check the packet type in the IP header option part of the received default route information, and recognize the packet type. After the default route information is recognized, each of PE routers 200*a*-200*c* registers the identifier, the receiving time information, and the transmission source information (which indicates from which router the default route information has been sent), contained in the default route information, into the default route management unit 216 of each router.

Figures 12, 13:
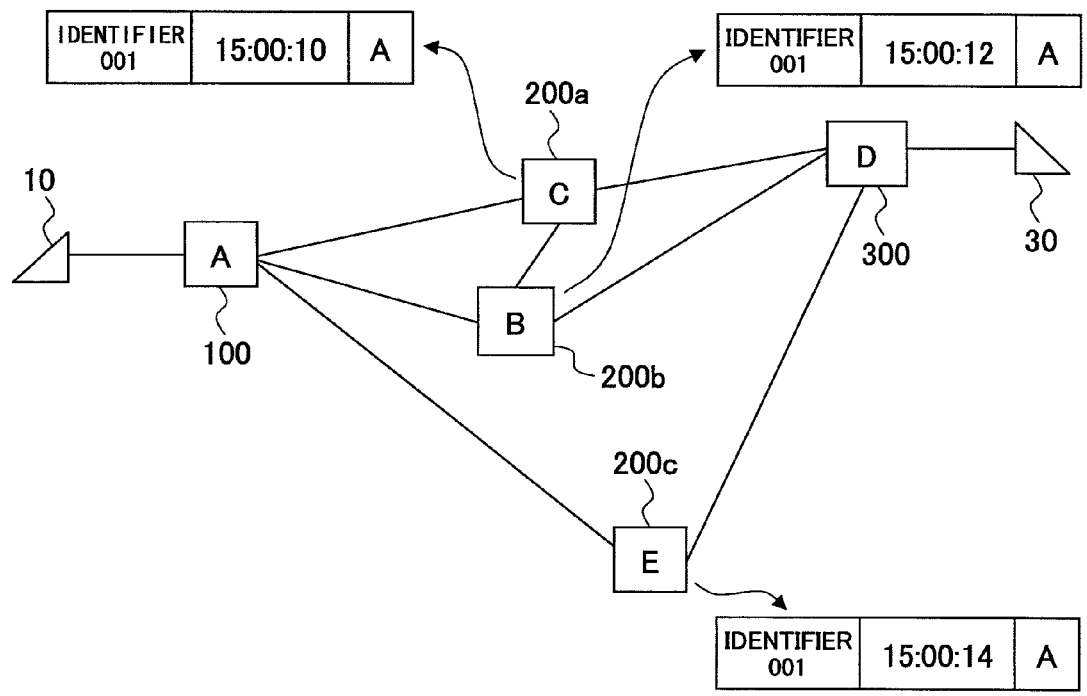
FIG. 12 is a diagram showing an example in which an identifier of a default route, receiving time information, and transmission source information are registered to a default route management unit.
FIG. 13 is a diagram showing an example of a routing table to which a default route is added.

FIG. 12 shows an example in which an identifier of a default route, receiving time information, and transmission source information indicating from which router the default route information is transmitted, are registered to the default route management unit.

At this time, the default route management unit 216 of PE routers 200*a*-200*c* performs addition of the new default route 001, as shown in FIG. 13.

FIG. 13 shows an example of the routing table to which the default route is added. The routing table of FIG. 5 mentioned above shows the example of CE router 100.

The information transmitted by broadcasting of CE router 100 is transmitted through the PE routers 200*a*-200*c* to the routes which have not been transmitted yet.

PE router 200*a* transmits default route information to CE router 300. PE router 200*b* transmits default route information to PE router 200*a* and CE router 300. PE router 200*c* transmits default route information to CE router 300.

Figures 14, 15:
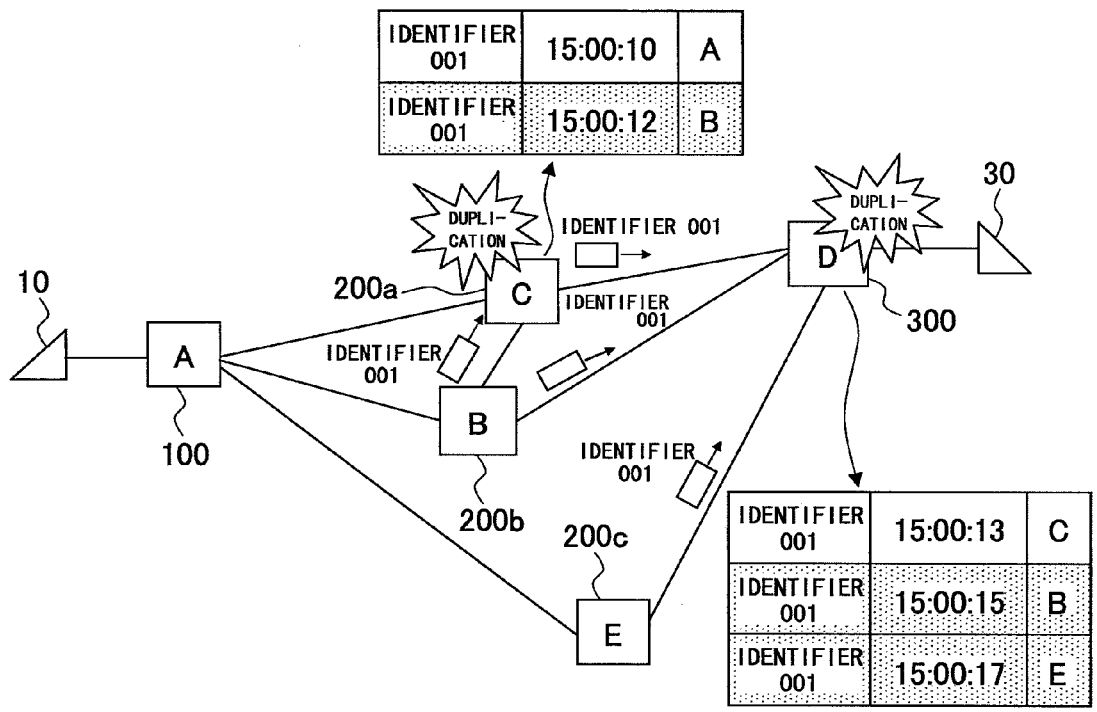
FIG. 14 is a diagram showing an example in which a duplication of received default route information occurs.
FIG. 15 is a diagram showing an example of a routing table to which a default route is added.

At this time, PE router 200*a* and CE router 300 receive the default route information with the same identifier (duplication of received default route information) from a plurality of routes, which causes a collision. FIG. 14 shows an example in which a duplication of received default route information occurs.

In the PE router 200a, default route information is first received from CE router 100 at the receiving time 15:00:10. Therefore, the PE router 200a discards the default route information received from PE router 200b at the receiving time 15:00:12 which is subsequent to the receiving time 15:00:10.

Similarly, in the CE router 300, default route information is received first from PE router 200a, which is considered effective default route information. And the default route information, which is subsequently received from PE routers 200b and 200c, is discarded.

At this time, the default route management unit 316 of CE router 300 performs addition of the new default route 001, as shown in FIG. 15. FIG. 15 shows an example of the routing table to which the new default route is added.

The new default route 001 which is generated by the CE router 100 can be used as the new default route in the PE routers 200a-200c and the CE router 300 after it is registered to the routing table 220,320 managed by the PE routers 200a-200c and the CE router 300.

Figure 29:
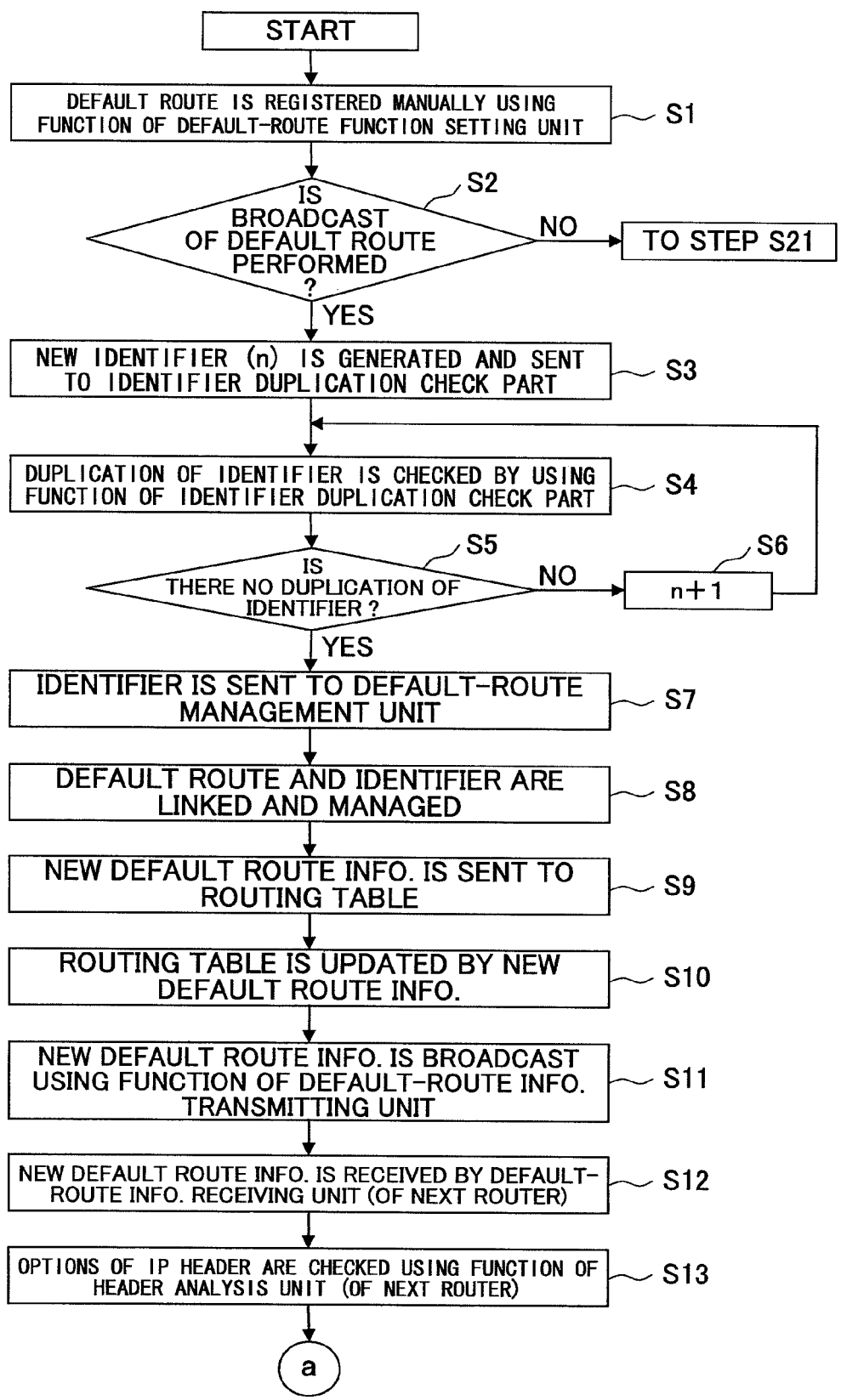
FIG. 29 is a flowchart for explaining operation which performs broadcast of a default route.
Figure 30:
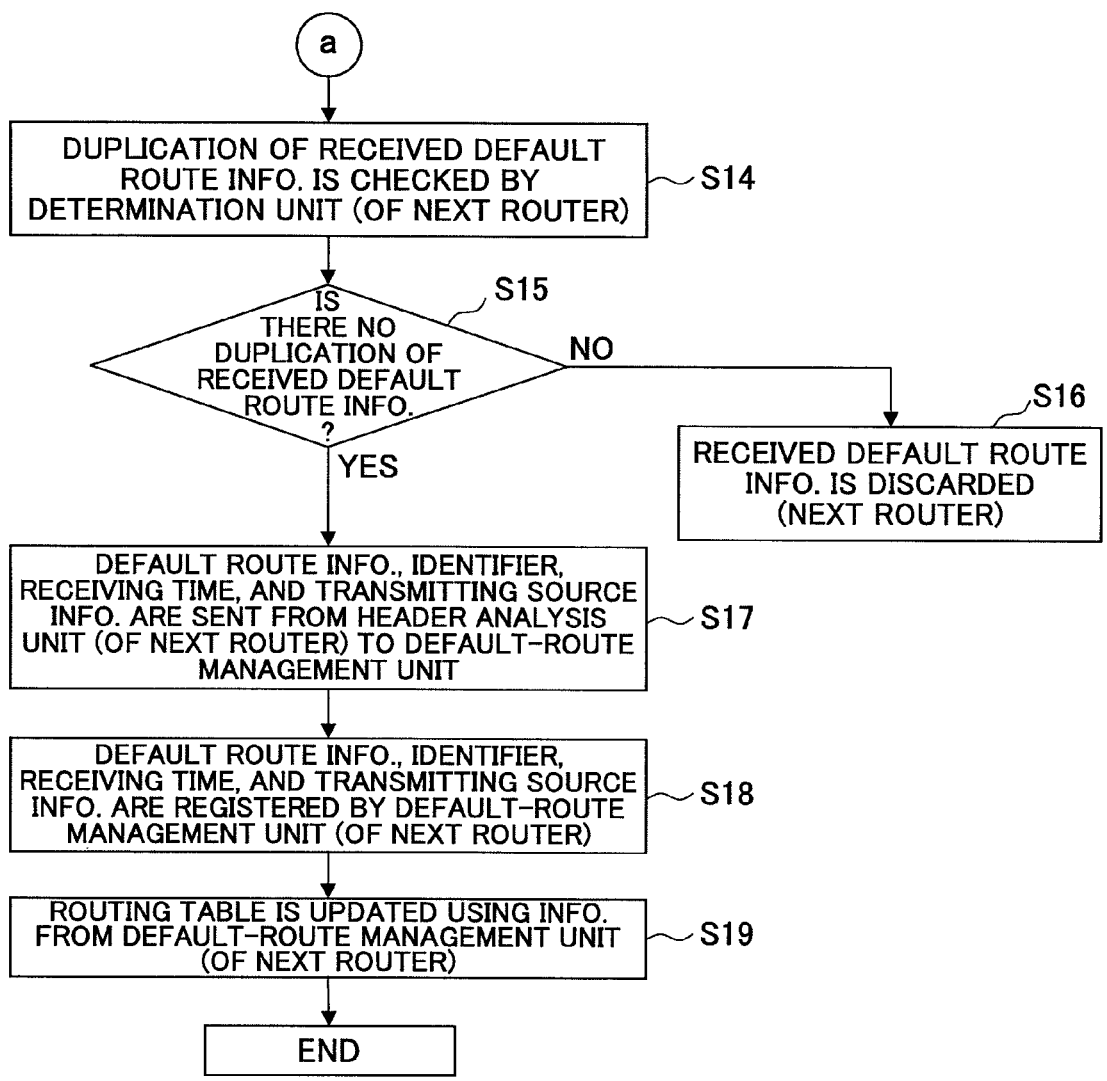
FIG. 30 is a flowchart for explaining the operation which performs the broadcast of the default route.

FIG. 29 and FIG. 30 are a flowchart for explaining operation which performs broadcast of a default route to the network.

Progressing to step S1, in the CE router 100, the default route is manually registered by using the function of the default-route function setting unit 117.

Progressing to step S2, the CE router 100 determines whether the option of performing broadcast of the default route being set to the network is selected according to the manual setup of the default-route function setting unit 117.

When it is determined that the option of performing broadcast of the default route being set to the network is not selected, the control of the CE router 100 will progress to step S21 of FIG. 31 mentioned later.

On the other hand, when it is determined that the option of performing broadcast of the default route being set to the network is selected (YES in S2), the control of the CE router 100 will progress to step S3.

At step S3, the identifier generation unit 114 of CE router 100 generates a new identifier (n) and notifies the new identifier to the identifier duplication check unit 122.

Progressing to step S4, the identifier duplication check unit 122 checks for duplication of the identifier.

Progressing to step S5, the identifier duplication check unit 122 determines whether there is no duplication of the identifier. When there is any duplication of the identifier (NO in S5), the control progresses to step S6, in which incrementing of the identifier (n+1) is performed, and returns to the above step S4.

That is, the identifier duplication check unit 122 repeats the incrementing of the identifier until there is no duplication of the identifier.

On the other hand, when the identifier duplication check unit 122 determines that there is no duplication of the identifier (YES in S5), the control progresses to step S7, in which the resulting identifier is transmitted to the default-route management unit 116.

Progressing to step S8, the default-route management unit 116 links the new default route and the new identifier and manages the same. Progressing to step S9, the default route management unit 116 transmits the new default route information to the routing table 120. Progressing to step S10, the routing table 120 is updated based on the new default route information received from the default route management unit 116.

Progressing to step S11, the CE router 100 transmits the new default route by broadcasting by using the function of the default route information transmitting unit 112.

Progressing to step S12, the PE router 200 which is the next router receives the default route information by using the function of the default route information receiving unit 213.

Progressing to step S13, the PE router 200 checks the option part of the IP header by using the function of the header analysis unit 215. As shown in FIG. 30, progressing to step S14, the PE router 200 checks for duplication of the received default route information by using the function of the determination unit 221.

Progressing to step S15, the PE router 200 determines whether there is no duplication of the received default route information. When there is any duplication (NO in S15), progressing to step S16, in which the received default route information is discarded.

On the other hand, when it is determined that there is no duplication of the received default route information (YES in S15), the control of the PE router 200 progresses to step S17, in which the function of the header analysis unit 215 is used to transmit the default route information, the identifier, the receiving time, and the transmission source information to the default-route management unit 216.

Progressing to step S18, the default route management unit 216 of PE router 200 registers the default route information, the identifier, the receiving time, and the transmission source information.

Progressing to step S19, the routing table 220 is updated based on the information received from the default route management unit 216.

In this embodiment, the subsequently received default route information is discarded. Alternatively, a set of 1st to n-th received default route information items may be made to effective ones. For example, when the 1st default route cannot be used due to a network node obstacle etc., the following default route may be used as an alternative route.

In this embodiment, a router which transmits default route information is provided and a broadcast of the default route information to respective routers in the network is performed so that the default route information is shared by the routers. Alternatively, it may be made to specify the following destination (next hop) originally as the setting of all the routers in the same network (the setting of the configuration information).

Next, a description will be given of another embodiment of the invention. In the following, an example in which default route information is beforehand prepared and used in the CE router 300 (the router which receives a default route) will be described.

The default route information which is beforehand prepared in the CE router 300 is used for management of the CE router 300, but a broadcast of the default route information to other routers in the network is not performed.

When setting of default routes (for example, a default route is manually inputted by a command function) is manually performed by using the function of the default route function setting unit 317, the CE router 300 manages the default routes as new default routes in the default route management unit 316 in accordance with the instruction of the control unit 319.

At this time, the CE router 300 is able to select one of the option of performing broadcast of the default routes to the network and the option of not performing the broadcast, according to the manual setup of the default route function setting unit 317. When the option of not performing the broadcast is selected, the CE router 300 operates as follows.

The identifier generation unit 314 generates a new identifier and notifies the new identifier to the default route management unit 316. At this time, the identifier duplication check unit 322 checks for duplication of the new identifier generated by the identifier generation unit 314, within the CE router 300, by reference to the information of the default-route management unit 316.

When there is any duplication, the identifier duplication check unit 322 repeats incrementing of the identifier until there is no duplication of the identifier within the same CE router 300. By this work, the identifier which is not duplication but is independent within the CE router 300 is given to the default route management unit 316.

The default route management unit 316 manages the new default route, and adds the new default route to the routing table 320.

As mentioned above, the CE router 300 is capable of performing setting of the default routes which are usable only by the router itself. The default route function setting unit 317 may be configured to set a plurality of new default routes, and it is capable of determining which default route among the default routes is actually used.

When a default route is received from another router in the same network, the function of the default-route function setting unit 317 is used to determine whether the default route of the router itself or the default route received from another router is actually used. The default route to be used can also be determined for every segment.

For example, the default route function setting unit 317 is capable of determining that the default route of the router itself is used for segment A, and to use the default route received from another router is used for segment B.

Next, a description will be given of an addition procedure of a default route by using an example of a network model of FIG. 16. In the network model of FIG. 16, the PE router 200 in the network system of FIG. 4 is replaced by a plurality of PE routers 200a-200c. Segments 1-3 and other segments indicate the segments connected to the router D, respectively.

In the CE router 300, setting of default routes is manually performed by using the function of the default route function setting unit 317. For example, in the CE router 300, default route 901 is set to segment 1, default route 902 is set to segment 2, default route 903 is set to segment 3, and default route 904 is set to another segment than the segments 1-3.

Next, an example in which the option of not performing broadcast of the four default routes to the network is selected at the time of setting the four default route in the CE router 300 will be described. The information which is managed by the default route management unit 316 in this case is as shown in FIG. 16.

Since the option of not performing broadcast of the default route to the network is selected, the identifiers in the information of FIG. 16 are expressed as the management serial number of the router itself (in this embodiment, the serial number which starts from 901 is the management serial number closed in each router). Since there is no receiving time information, the content of the corresponding column is expressed by "–". And a default route is set up for every identifier.

For example, in the case of the information of FIG. 16, the default route that is set up for identifier 901 is PE router 200a. In this manner, when setting up a default route, it is possible to set a specific default route for every segment. "All" contained in the default route information of FIG. 16 means another segment than the segments 1-3. Therefore, when a default route is used by the communication from another segment than the segments 1-3, the received packet is transmitted to the PE router 200c.

The default-route management unit 316 performs addition of a new default route to the routing table 320, as shown in FIG. 17.

FIG. 17 shows an example of the routing table to which the default routes are added. In the routing table of FIG. 17, the default routes of identifiers "901"-"904" are added.

By registering into the routing table 320 the new default routes 901-904 which are generated by the CE router 300, the CE router 300 can use any of them as a new default route.

Figure 31:
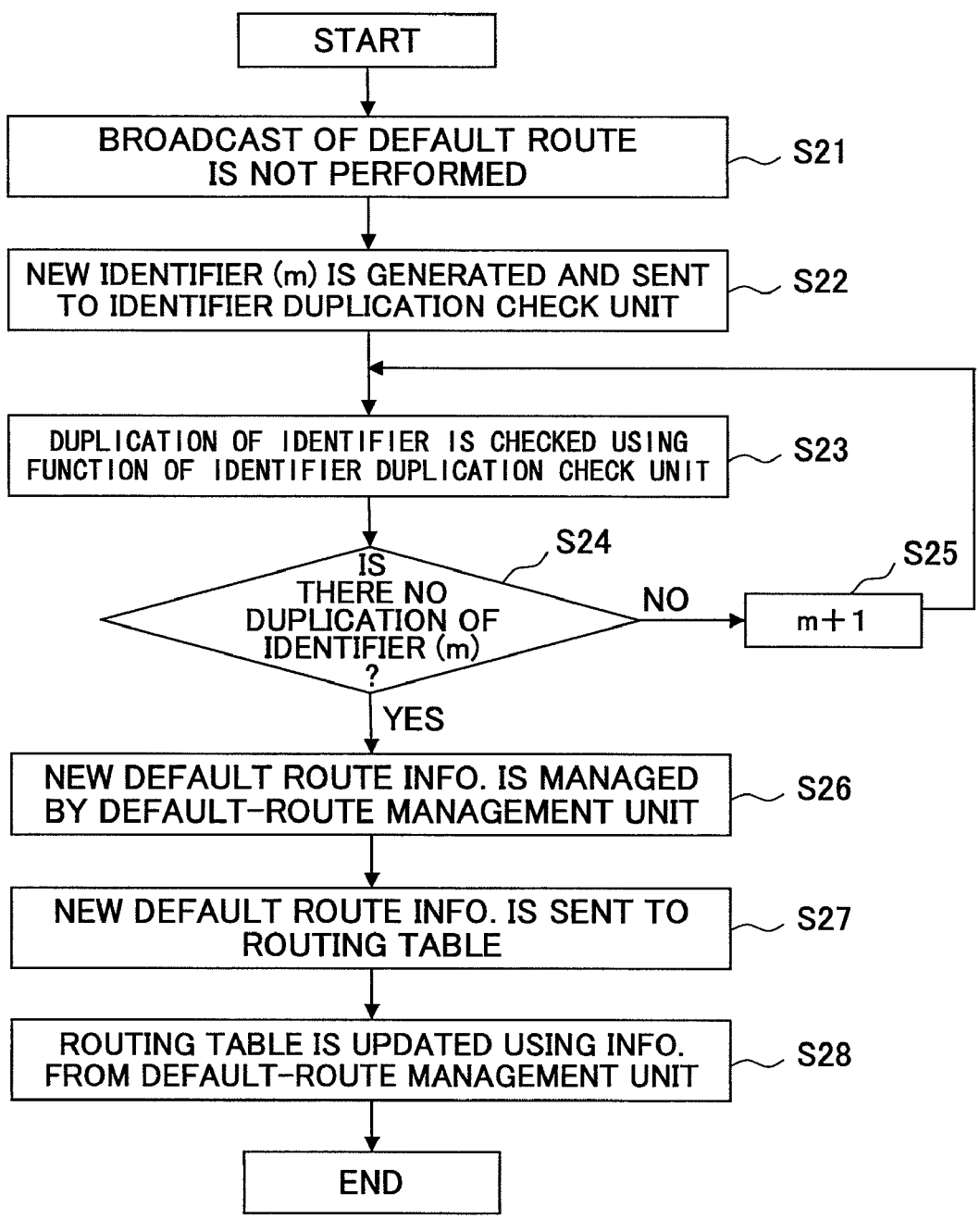
FIG. 31 is a flowchart for explaining operation which does not perform broadcast of a default route.

FIG. 31 is a flowchart for explaining operation which does not perform broadcast of the default route.

Progressing to step S21, CE router 300 makes the choice that it does not perform broadcast of the default route being set to the network, according to the manual setup of the default route function setting unit 317.

At step S22, identifier generation unit 314 of CE router 300 generates a new identifier (m), and notifies it to identifier duplication check unit 322. Progressing to step S23, duplication check unit 322 checks duplication of the identifier.

Progressing to step S24, duplication check unit 322 determines whether there is no duplication of the identifier. When there is any duplication of the identifier (NO in S24), the control progresses to step S25, in which the identifier (m) is incremented (m+1), and the control returns to step S23.

That is, identifier duplication check unit 322 repeats incrementing of the identifier until there is no duplication of the identifier.

On the other hand, when identifier duplication check unit 322 determines that there is no duplication of the identifier (YES in S24), the control progresses to step S26 and the resulting new identifier is transmitted to default-route management unit 316. Default-route management unit 316 links the new default route and the new identifier and manages the same.

Progressing to step S27, default-route management unit 316 notifies the new default route information to routing table 320.

Progressing to step S28, the routing table 320 is updated based on the new default route information from default-route management unit 316.

Next, a description will be given of another embodiment of the invention. In the following, an example using a combination of the previously described embodiments will be explained. An embodiment of CE router 300 will be described.

Figure 18:
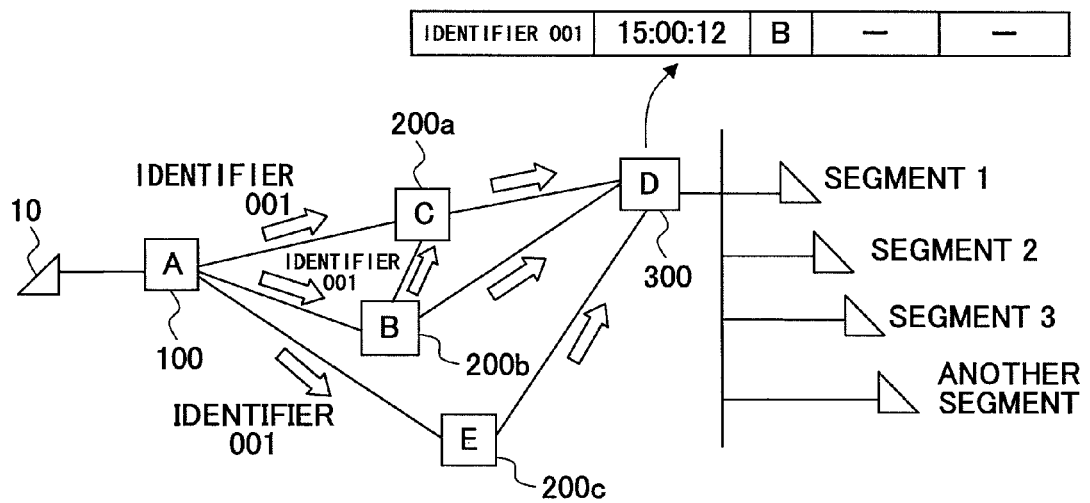
FIG. 18 is a diagram showing an example in which new default route information is transmitted from CE router.

FIG. 18 shows an example in which new default route information is transmitted from CE router. In this embodiment, a combination of the previously described embodiments is used and duplicate explanation will be omitted suitably.

First, CE router 100 transmits the default route information of identifier 001 by broadcasting. CE router 300 receives the default route information of identifier 001 from PE routers 200a-200c.

Since CE router 300 received the default route information from PE router 200b first, PE router 200b is registered into default route management unit 316 as default route 001.

Figure 19:
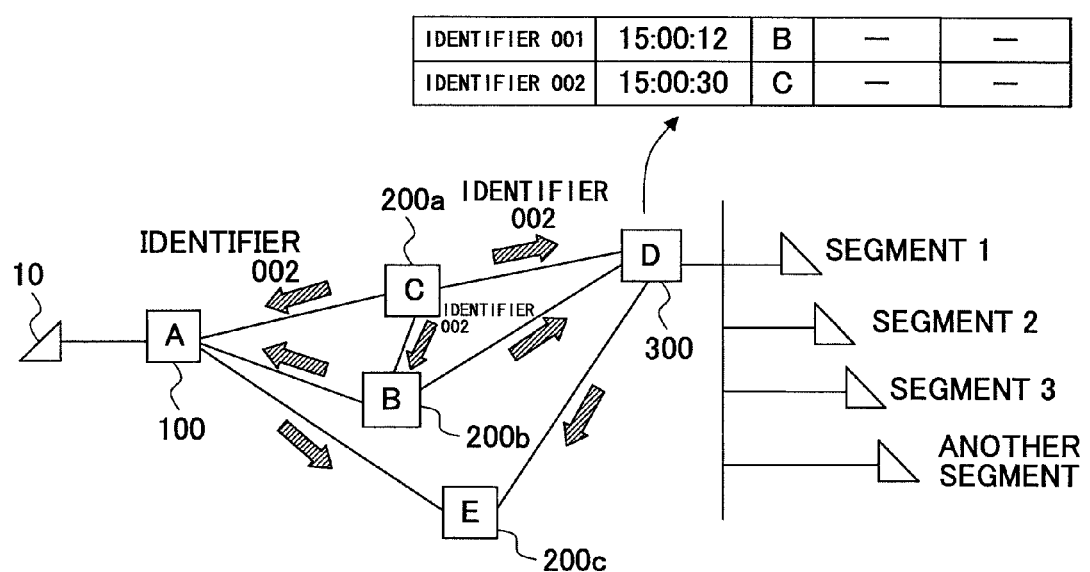
FIG. 19 is a diagram showing an example in which new default route information is transmitted from PE router.

FIG. 19 shows an example in which new default route information is transmitted from PE router. PE router 200a transmits the default route information of identifier 002 by broadcasting, after the default route information of identifier 001 is received from CE router 100.

Since default route management unit 216 of the router itself is checked and identifier 001 is already registered, the following identifier 002 is used for PE router 200a.

CE router 300 receives the default route information of identifier 002 from PE routers 200a and 200b.

Since CE router 300 received the default route information from PE router 200a first, PE router 200a is registered into default route management unit 316 as default route 002.

Figure 20:
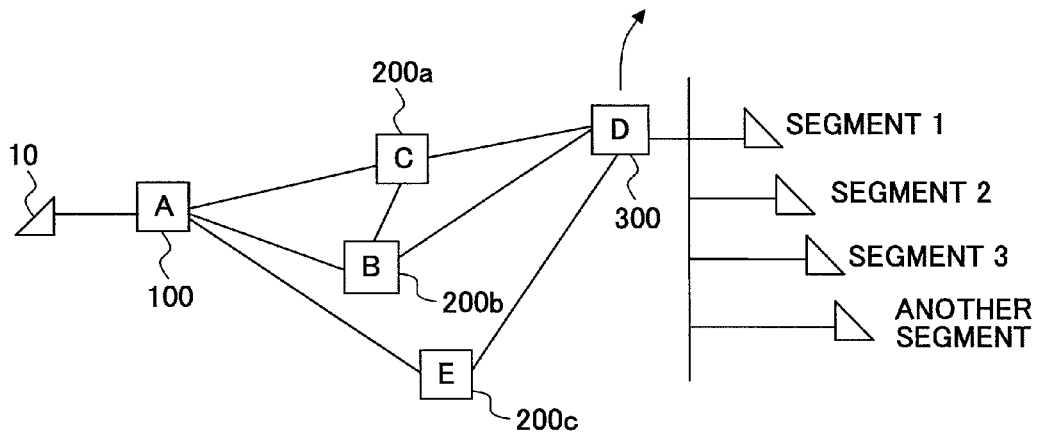
FIG. 20 is a diagram showing an example in which new default route information from CE router is registered.

FIG. 20 shows an example in which new default route information from CE router is registered.

At this time, the default route information of identifiers 001 and 002 is registered into default route management unit 316 of CE router 300.

CE router 300 registers default route information manually by default route function setting unit 317.

Next, PE router 200c is registered as a default route, and the example chosen although it did not carry out broadcast into the network will be described. This new default route can use only CE router 300.

This new default route is registered into default route management unit 316 as routing information of identifier 901.

Figure 21:
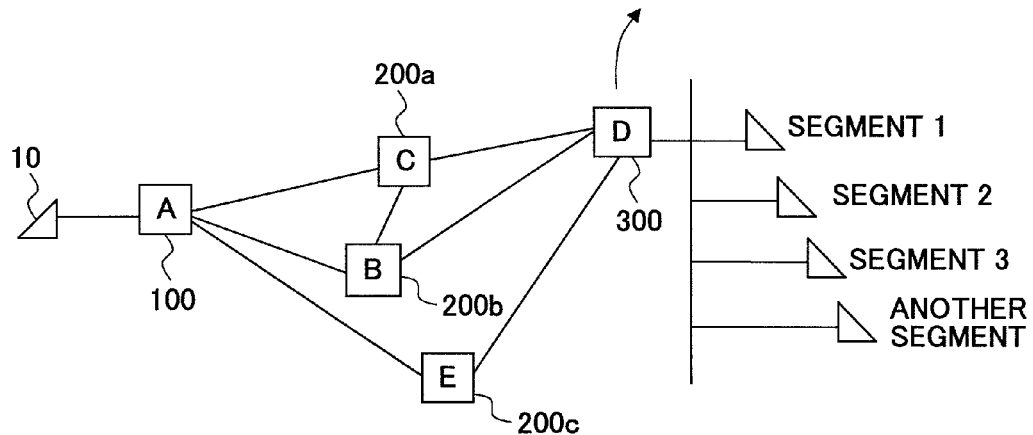
FIG. 21 is a diagram showing an example in which a default route is set to a segment.

FIG. 21 shows an example in which a default route is set to a segment.

CE router 300 sets up the default route of each segment manually by default-route function setting unit 317.

Next, default route 901 is used as other default routes using default route 002 of segment 2, using default route 001 as a default route of segment 1.

If the default route of each segment is set up by default route function setting unit 317, the default route information which default route management unit 316 manages will become as it is shown in FIG. 21.

The linking which default route the segment of the subordinate of CE router 300 uses completes default route management unit 316.

Figures 22, 23:
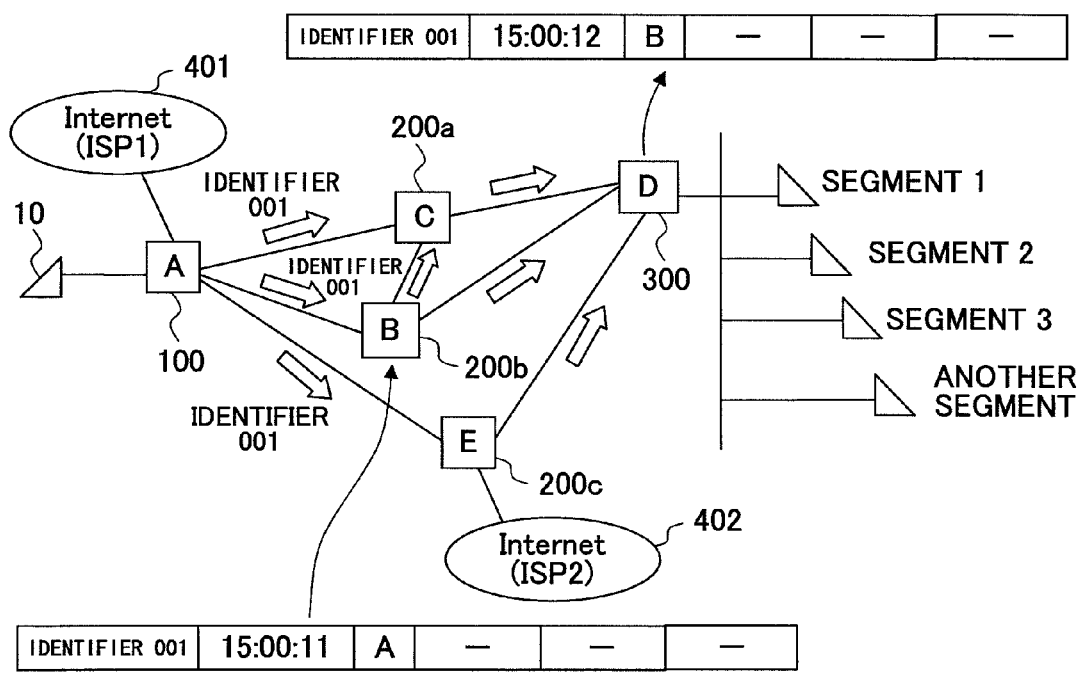
FIG. 22 is a diagram showing an example of a routing table in which a default route of each segment is set.
FIG. 23 is a diagram showing an example in which new default route information is transmitted from CE router.

As shown in FIG. 22, if the default route of each segment is set up by default route function setting unit 317, default route management unit 316 will set up the default route of each segment to routing table 320.

FIG. 22 shows an example of the routing table in which the default route of each segment is set.

In the routing table of FIG. 22, default route 901 is set as default route 001 at segment 1, and is set as segment 2 at the segment of default route 002 and others.

Although the example which sets up a default route for every segment in this embodiment was explained, it is also possible to set up a default route per router.

Figure 32:
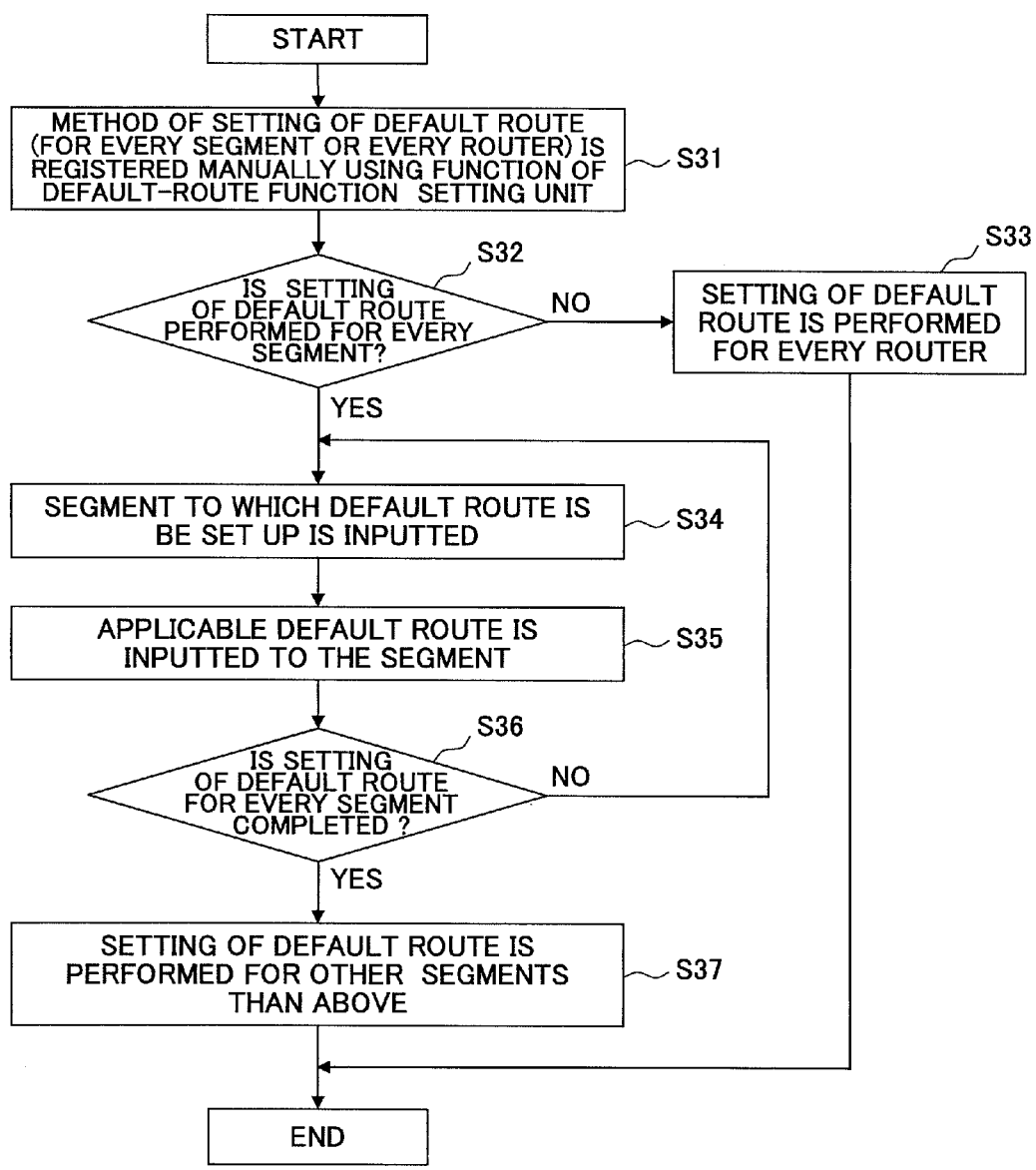
FIG. 32 is a flowchart for explaining operation which performs setting of a default route for every segment or for every router.

FIG. 32 is a flowchart for explaining operation which performs setting of a default route in every segment or for every router.

Progressing to step S31, CE router 300 chooses a default route as every segment and a router unit according to the manual setup of default route function setting unit 317.

Progressing to step S32, it is determined whether CE router 300 sets up a default route for every segment.

If it determines with not setting up a default route for every segment (NO in step S32), CE router 300 will progress to step S33, and will set up the default route in a router unit.

On the other hand, if it determines with setting up a default route for every segment (YES in step S32), CE router 300 will progress to step S34, and will input a segment to set a default route.

Progressing to step S35, CE router 300 inputs the default route made to apply to the segment inputted at step S34.

Progressing to step S36, it is determined whether setting of default routes for every segment ended CE router 300.

When it is determined that the setting of default routes for every segment is not completed (NO in step S36), CE router 300 will return to step S34.

On the other hand, when it is determined that the setting of default routes for every segment is completed (YES in step S36), it progresses to step S37, and CE router 300 sets up default routes for other segments than the segments for which the setting of default routes is completed. And the processing is ended.

Next, a description will be given of another embodiment of the invention. In this embodiment, there is provided a case in which the invention is applied to Internet connection. An example of CE router 300 will be explained.

FIG. 23 is a diagram showing the example which transmits new default route information from CE router.

First, CE router 100 transmits the default route information of identifier 001 by broadcasting.

PE router 200b receives the default route information of identifier 001.

In PE router 200b, CE router 100 is registered into default route management unit 216 as default route 001.

CE router 300 receives the default route information of identifier 001 from PE routers 200a-200c.

Since CE router 300 received the default route information from PE router 200b first, PE router 200b is registered into default route management unit 316 as default route 001.

Figure 24:
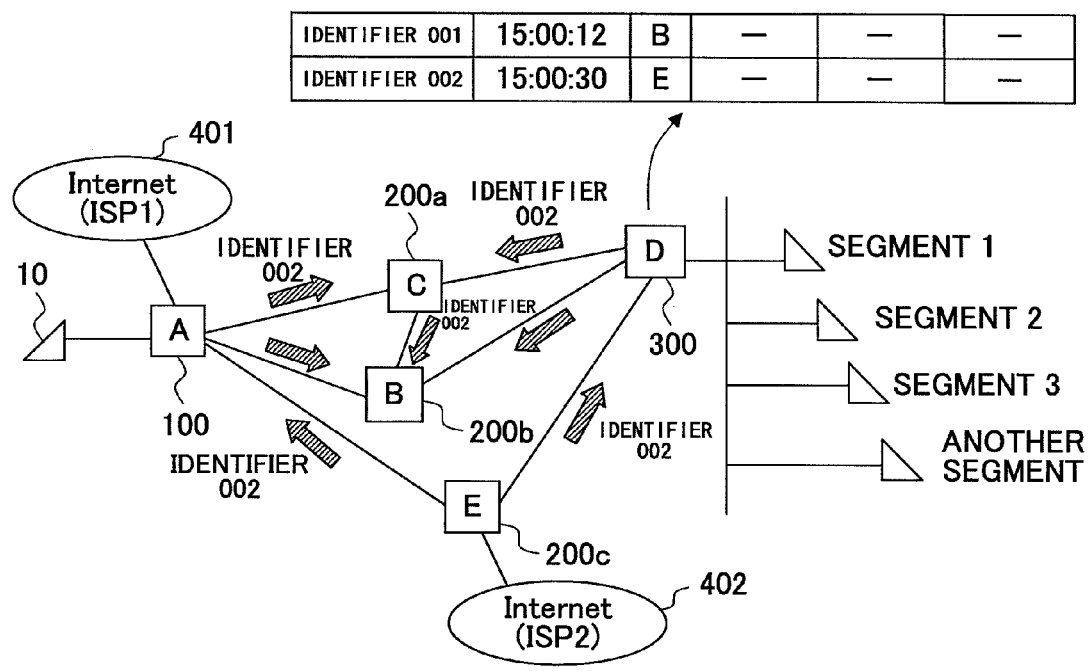
FIG. 24 is a diagram showing an example in which new default route information is transmitted from PE router.

FIG. 24 shows an example in which new default route information is transmitted from PE router.

PE router 200c transmits the default route information of identifier 002 by broadcasting, after the default route information of identifier 001 is received from CE router 100.

Since default route management unit 216 of the router itself is checked and identifier 001 is already registered, the following identifier 002 is used for PE router 200c.

CE router 300 receives the default route information of identifier 002 from PE router 200c.

Since CE router 300 received the default route information from PE router 200c first, PE router 200c is registered into default route management unit 316 as default route 002.

Figure 25:
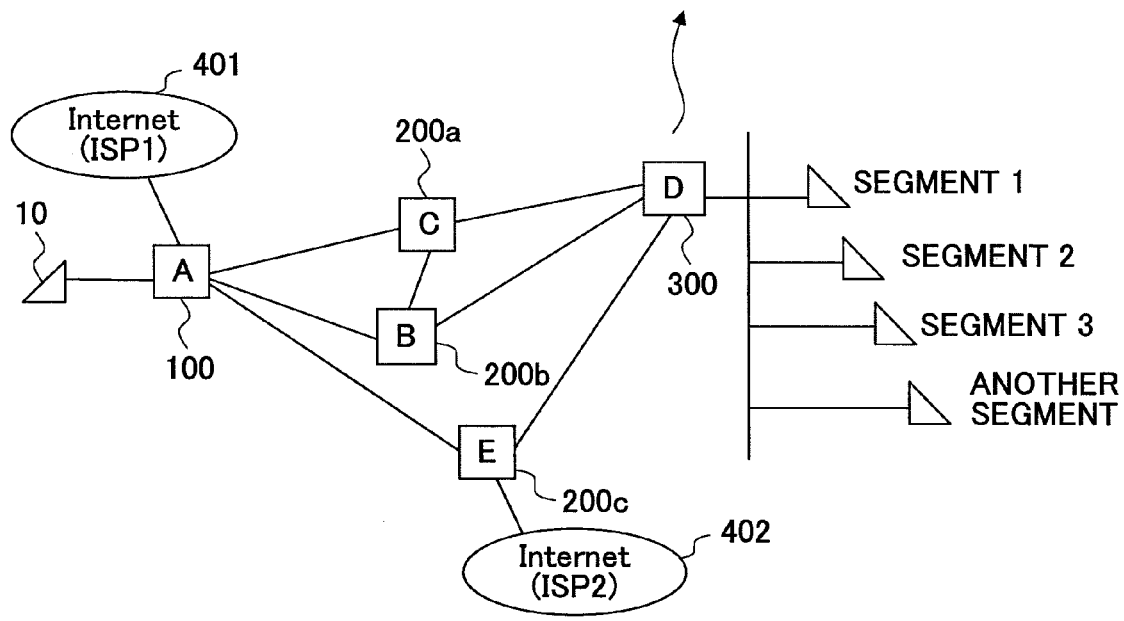
FIG. 25 is a diagram showing an example in which new default route information from CE router is registered.

FIG. 25 shows an example in which new default route information from CE router is registered.

At this time, the default route information of identifiers 001 and 002 is registered into default route management unit 316 of CE router 300.

CE router 300 registers default route information manually by default route function setting unit 317.

Next, PE router 200a is registered as a default route, and the example as which "it does not perform the broadcast" was chosen into the network will be described.

This new default route can use only CE router 300. This new default route is registered into default route management unit 316 as routing information of identifier 901.

Figures 26, 27:
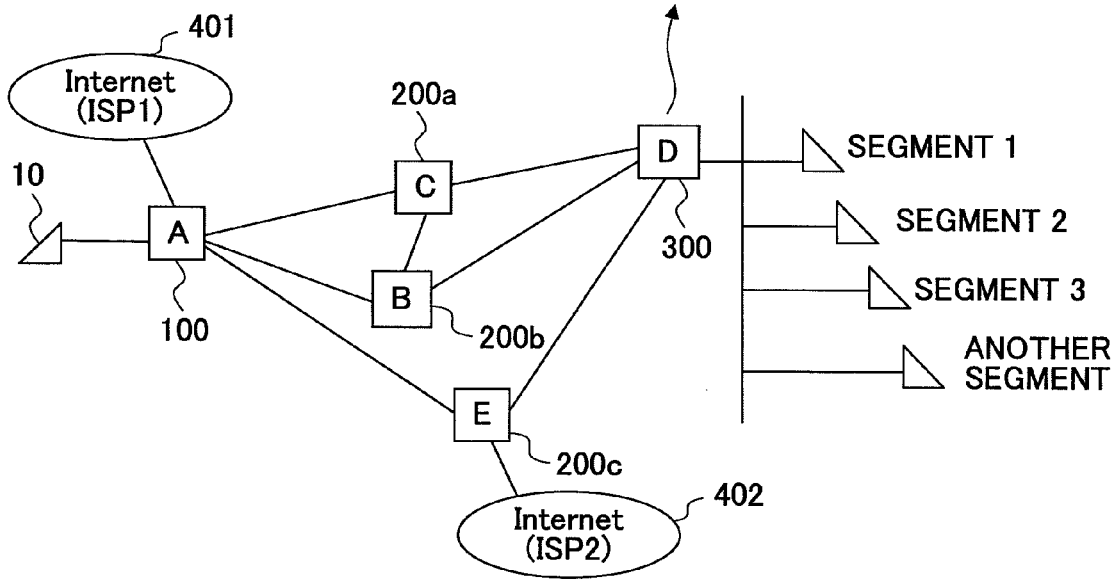
FIG. 26 is a diagram showing an example in which a default route is set to a segment.
FIG. 27 is a diagram showing an example of a detour information which is managed by a default route detour management unit.

FIG. 26 shows an example in which a default route is set to a segment.

CE router 300 sets up the default route of each segment manually by default-route function setting unit 317.

Next, default route 901 is used as other default routes using default route 002 of segment 2, using default route 001 as a default route of segment 1.

Segment 1 can be bypassed at the time of a line failure, although the destination of a default route is identifier 001 (PE router 200b be suitable).

FIG. 27 shows an example of the detour information managed by the default-route detour management unit.

For the detour information of FIG. 27, the default route of the 1st priority and the 2nd priority is set up for every segment.

The default route of the 1st priority bypasses CE router 300 to the default route of the 2nd priority by the function of default detour management unit 323 at the time of a line failure.

When "–" is set as the default route of the 2nd priority, CE router 300 does not detour. For example, in the case of segment 1, default route 001 of the 1st priority bypasses CE router 300 to default route 002 of the 2nd priority by the function of default detour management unit 323 at the time of a line failure.

Default route 002 of the 1st priority bypasses CE router 300 to default route 001 of the 2nd priority by the function of default detour management unit 323 similarly about segment 2 at the time of a line failure.

If the default route of each segment is set up by default route function setting unit 317, the default route information which default route management unit 316 manages will become as it is shown in FIG. 26.

The linking which default route the segment of the subordinate of CE router 300 uses completes default route management unit 316.

As shown in FIG. 28, if the default route of each segment is set up by default route function setting unit 317, default route management unit 316 will set up the default route of each segment to routing table 320.

FIG. 28 shows an example of the routing table in which the default route of each segment is set.

In the routing table of FIG. 28, default route 901 is set as default route 001 at segment 1, and is set as segment 2 at the segment of default route 002 and others.

In the routing table of FIG. 28, those with a detour are set as segment 1 and segment 2. Although this embodiment explained the example which sets up a default route for every segment, it is also possible to set up a default route per router.

When segment 1 of the subordinate of CE router 300 uses Internet 401 by the above-mentioned processing, the path of CE router 300, PE router 200b, and CE router 100 is chosen.

When the data packet is actually transmitted, the packet type of the IP header option part is set to "2", which indicates a data packet, and an identifier is set up and sent out to "001".

The identifier of the IP header option part is checked by PE router 200b which has received the data packet from CE router 300.

PE router 200b transmits a data packet to CE router 100 as a transmission destination corresponding to an identifier "001" with reference to the default route information managed by the default route management unit 216.

At the time of an error or line failure of PE router 200b, the identifier of the IP header option part is changed to "002" by the function of default route detour management unit 323. Then, CE router 300 transmits a data packet to PE router 200c in order to use default route 002 as an alternative route.

When segment 2 of the subordinate of CE router 300 uses Internet 402, the path of CE router 300 and PE router 200c is chosen.

At the time of an error or line failure of PE router 200c, the identifier of the IP header option part is changed to "001".

CE router 300 transmits a data packet to PE router 200b in order to use default route 001 as an alternative route.

Next, a description will be given of another embodiment of the invention. In this embodiment, there is provided a case in which a default route is notified to CE router 300 (router which receives a default route) by CE router 100 (router which performs broadcast of a default route).

After a manual setup (for example, a default route is manually inputted by a command function) is manually performed by default route function setting unit 117, CE router 100 the default route with the instruction of control unit 119, it manages as a new default route at default route management unit 116.

At this time, it performs broadcast of the CE router 100 to the network according to the manual setup of default route function setting unit 117, it can be made broadcast or non-broadcast can be chosen.

It is as follows when carrying out broadcast to a network. The identifier generation unit 114 generates an identifier and notifies default route management unit 116 of a new identifier.

At this time, identifier duplication check unit 122 checks with the information of default route management unit 116 whether the new identifier generated by identifier generation unit 114 overlaps in the same network, and checks it.

If it overlaps, identifier duplication check unit 122 will add 1 to an identifier until it stops overlapping in the same network. The identifier which default route management unit 116 does not overlap in a network and which becomes independent is given by this work.

In the network, default route management unit 116 makes each default route link with the identifier which becomes independent and manages it.

Default route management unit 116 performs, as shown in FIG. 5 which mentioned the addition of the new default route to routing table 120.

Then, control unit 119 issues notifying a new default route and the instruction in the same network to default route information transmitting unit 112.

In default route information transmitting unit 112, broadcast transmission of the default route information is carried out into a network using the Ethernet frame according to IPv4 or IPv6 mentioned above using FIG. 6 and FIG. 7.

As shown in FIG. 8 and FIG. 9, default route information transmitting unit 112 stores a packet type and an identifier in the option part of the IPv4 header or IPv6 header.

A packet type is the information for identifying a default route information packet and a default conversion data packet.

An identifier is the information for identifying a plurality of default routes. Default route information transmitting unit 112 sets up a broadcast address as a destination address of IPv4 header or IPv6 header.

Next, the network system of FIG. 41 explains how a default route is notified to CE router 300 located at an edge of a network from CE router 100.

By the function of default route information transmitting unit 112, CE router 100 transmits default route information to all the routes (relay interface 111 in FIG. 41) by broadcasting.

Default route information transmitting unit 112 transmits a new default route to PE router 200 through relay interface 111. PE router 200 transmits a new default route to CE router 300 through relay interface 211.

CE router 300 receives the default route information from CE router 100 in default route information receiving unit 313 through relay interface 311.

Next, the addition procedure of a default route will be described to an example for the network model of FIG. 10 mentioned above.

The network model of FIG. 10 is the composition that PE routers 200 in the network system of FIG. 41 are a plurality of PE routers 200a-200c.

CE router 100 transmits a new default route by broadcasting, as shown in FIG. 11 through relay interface 111 from default route information transmitting unit 112.

PE routers 200*a*-200*c* relay the default route from CE router 100 to CE router 300. CE router 300 receives the default route from CE router 100 through PE router 200*a*-200*c*.

In the example of FIG. 11, default route 001 is transmitted to CE router 300 through PE routers 200*a*-200*c*.

In CE router 300, the function of default route information receiving unit 313 receives default route information through relay interface 311.

In CE router 300, the function of header analysis unit 315 is used by the instruction of control unit 319 to check the packet type of the IP header option part of the received default route information, and recognize what packet it is. After the default route information is recognized, CE router 300 the transmission source information (transmitting source IP address) which shows whether default route information has been sent is registered into a table as shown in FIG. 42 from the identifier contained in default route information at default route management unit 316 which holds, and which router.

FIG. 42 shows an example of the table which is managed by the default route management unit.

The table of FIG. 42 associates and registers the transmission source information which shows whether default route information has been sent from the identifier of a default route, and which router.

Default route management unit 316 adds new default route 001, as shown in FIG. 43.

FIG. 43 shows an example of the routing table to which the default route is added.

The routing table of FIG. 43 shows the example of CE router 300. It is omitting, although an original default route is also contained in routing table.

New default route 001 which CE router 100 published can be used now as a new default route with CE router 300 by registering with routing table 320 managed with CE router 300.

The flowchart for explaining operation which performs broadcast of the default route is essentially the same as the above-mentioned flowchart of FIG. 29 and FIG. 30 except receiving time is not handled, and a description thereof will be omitted.

Next, a description will be given of another embodiment of the invention. In this embodiment, there is provided a case in which the invention is applied to Internet connection. An example of CE router 300 will be explained.

Figure 44:
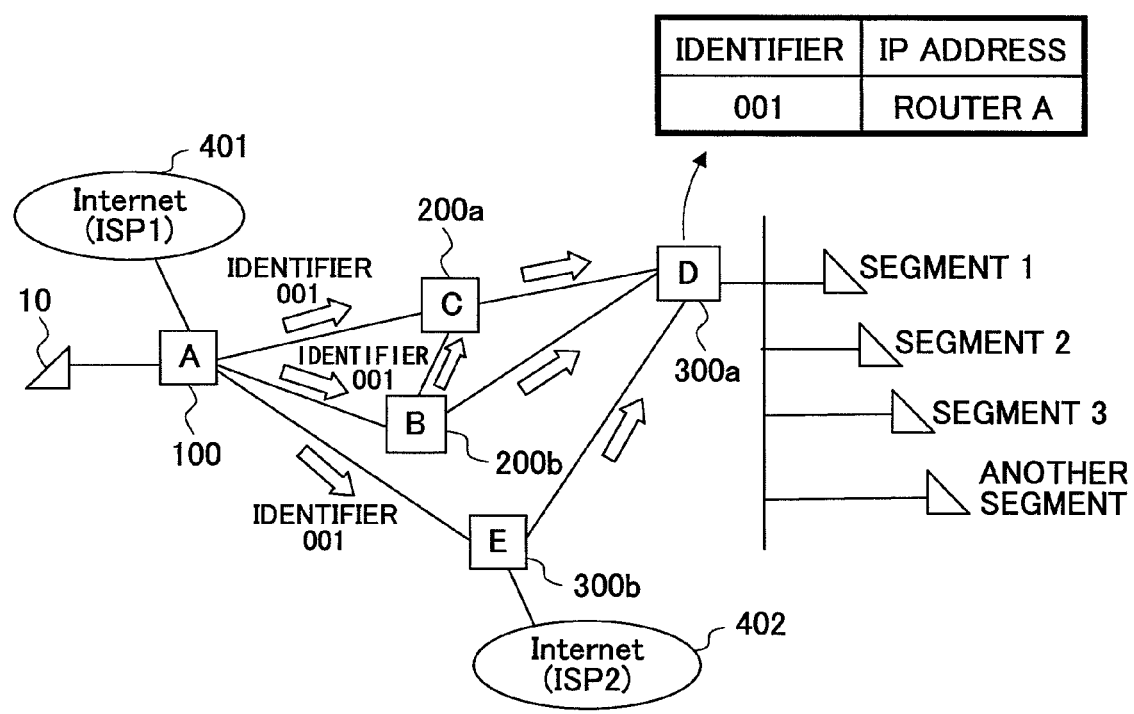
FIG. 44 is a diagram showing an example in which default route information of identifier 001 is transmitted from CE router.

FIG. 44 is a diagram showing the example which transmits the default route information of identifier 001 from CE router.

First, CE router 100 transmits the default route information of identifier 001 by broadcasting.

PE routers 200*a* and 200*b* and CE routers 300*a* and 300*b* receive the default route information of identifier 001.

For example, CE router 300*a* associates and registers default route 001 and the IP address of CE router 100 into default route management unit 316.

Figure 45:
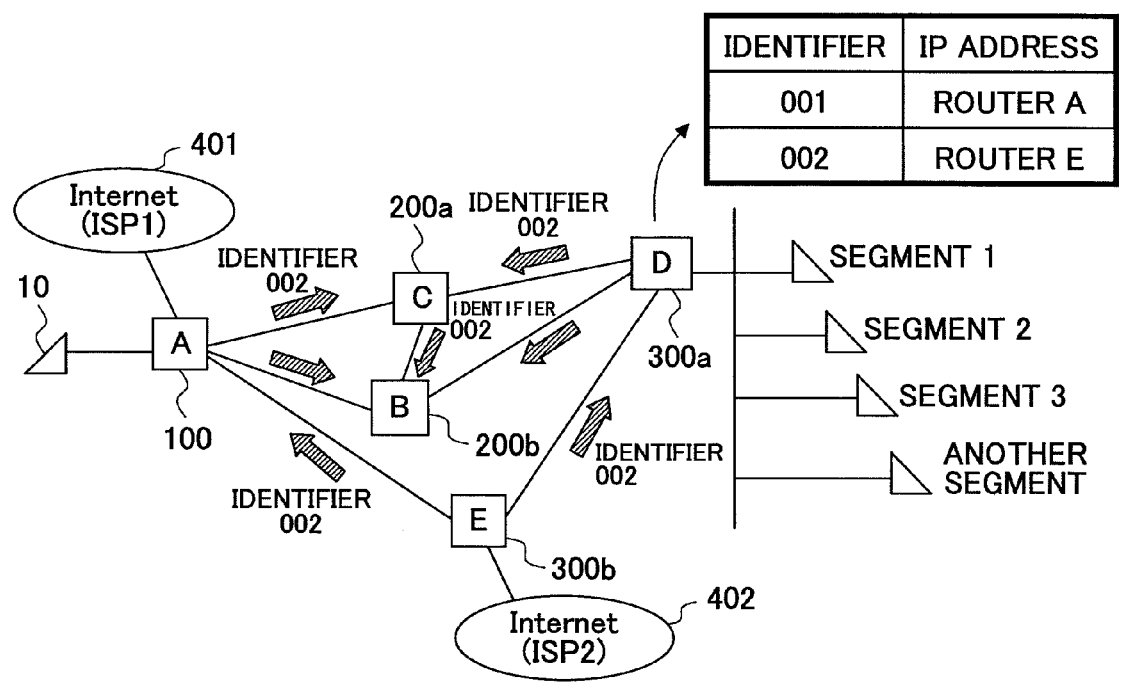
FIG. 45 is a diagram showing an example in which default route information of identifier 002 is transmitted from CE router.

FIG. 45 is a diagram showing the example which transmits the default route information of identifier 002 from CE router.

CE router 300*b* transmits the default route information of identifier 002 by broadcasting, after the default route information of identifier 001 is received from CE router 100.

Since default route management unit 316 of the router itself is checked and identifier 001 is already registered, the following identifier 002 is used for CE router 300*b*.

For example, CE router 300*a* receives the default route information of identifier 002 from CE router 300*b*.

CE router 300*a* associates and registers default route 002 and the IP address of CE router 300*b* into default route management unit 316.

Figure 46:
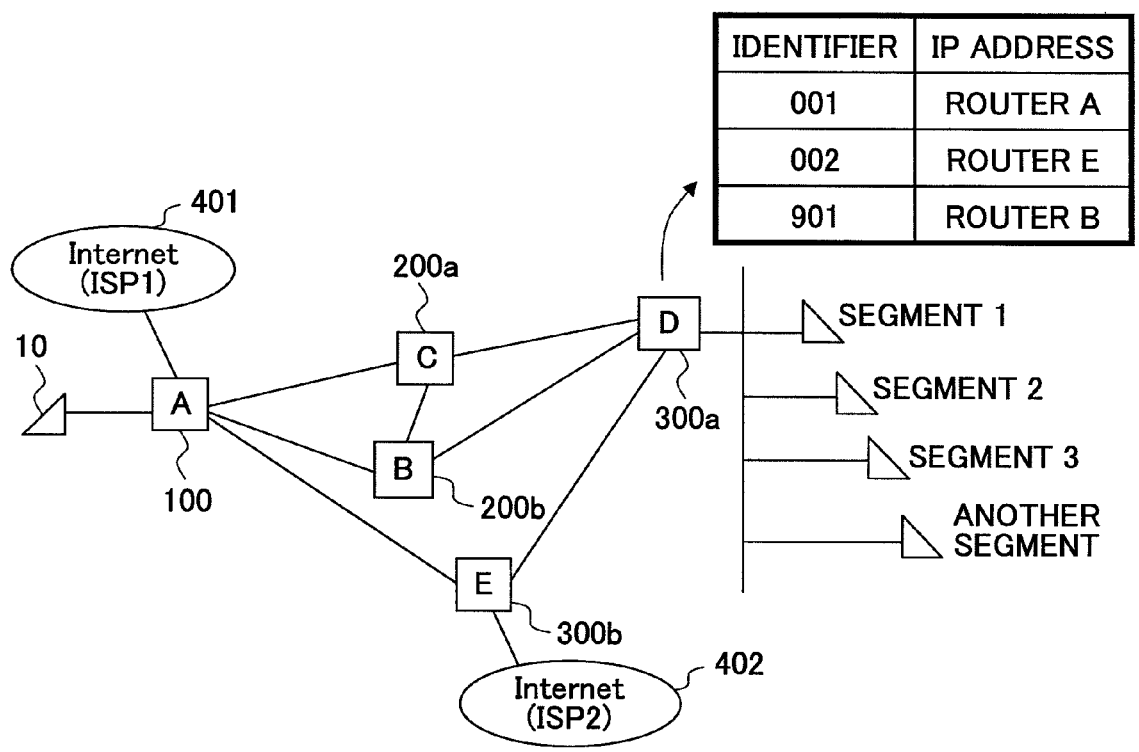
FIG. 46 is a diagram showing an example in which default route information of identifier 901 which is not broadcast to the network is registered.

FIG. 46 is a diagram showing the example which registers into a network the default route information of identifier 901 which does not perform the broadcast.

The default route information of identifiers 001 and 002 is registered into default route management unit 316 of CE router 300*a*.

CE router 300*a* registers default route information manually by default route function setting unit 317.

Next, PE router 200*b* is registered as a default route, and the example as which "it does not perform the broadcast" is chosen into the network will be described.

This new default route can use only CE router 300*a*. CE router 300*a* associates and registers default route 901 and the IP address of PE router 200*b* into default route management unit 316.

Figure 47:
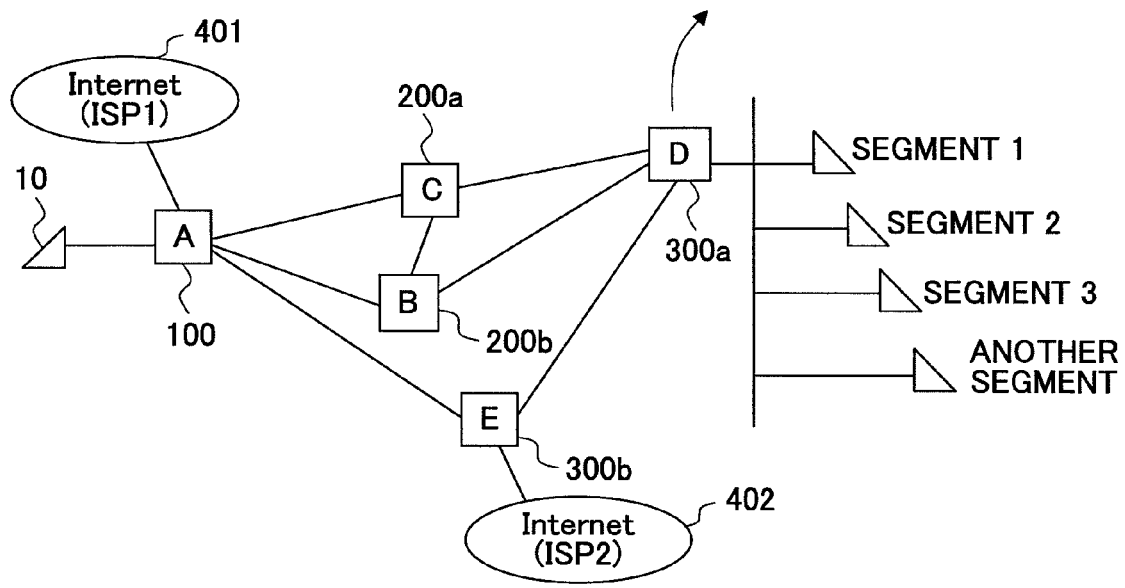
FIG. 47 is a diagram showing an example in which a default route is set to a segment.

FIG. 47 is a diagram showing the example which sets a default route as a segment. CE router 300*a* sets up the default route of each segment manually by default route function setting unit 317.

Next, default route 901 is used as a default route of other segments using default route 002 of segment 2, using default route 001 as a default route of segment 1.

Segment 1 can be bypassed at the time of a line failure, although the destination of a default route is identifier 001 (be suitable CE router 100).

For the detour information of FIG. 27 mentioned above, the default route of the 1st priority and the 2nd priority is set up for every segment.

By the function of default detour management unit 323, the default route of the 1st priority bypasses CE router 300*a* to the default route of the 2nd priority at the time of a line failure.

When "–" is set as the default route of the 2nd priority, CE router 300*a* does not detour. For example, in the case of segment 1, default route 001 of the 1st priority bypasses CE router 300*a* to default route 002 of the 2nd priority by the function of default detour management unit 323 at the time of a line failure.

Default route 002 of the 1st priority bypasses CE router 300*a* to default route 001 of the 2nd priority by the function of default detour management unit 323 similarly about segment 2 at the time of a line failure.

If the default route of each segment is set up by default route function setting unit 317, the default route information which default route management unit 316 manages will become as it is shown in FIG. 47.

By the above, default route management unit 316 completes the linking which default route the segment of the subordinate of CE router 300*a* uses.

As shown in FIG. 48, if the default route of each segment is set up by default route function setting unit 317, default route management unit 316 will set up the default route of each segment to routing table 320.

FIG. 48 is a block diagram of an example of the routing table to which the default route of each segment was set.

In the routing table of FIG. 48, default route 901 is set as default route 001 at segment 1, and is set as segment 2 at the segment of default route 002 and others.

In the routing table of FIG. 48, those with a detour are set as segment 1 and segment 2. Although this embodiment explained the example which sets up a default route for every segment, it is also possible to set up a default route per router.

When segment 1 of the subordinate of CE router 300*a* uses Internet 401 by the above-mentioned processing, the path of CE router 300*a*, PE router 200*a* (or PE router 200*b*), and CE router 100 is chosen.

When there is actually connection with Internet 401 from segment 1 of the subordinate of CE router 300a, CE router 300a operates as follows.

First, in CE router 300a, it checks that the default route of segment 1 is CE router 100 with reference to routing table 320.

Figure 49:
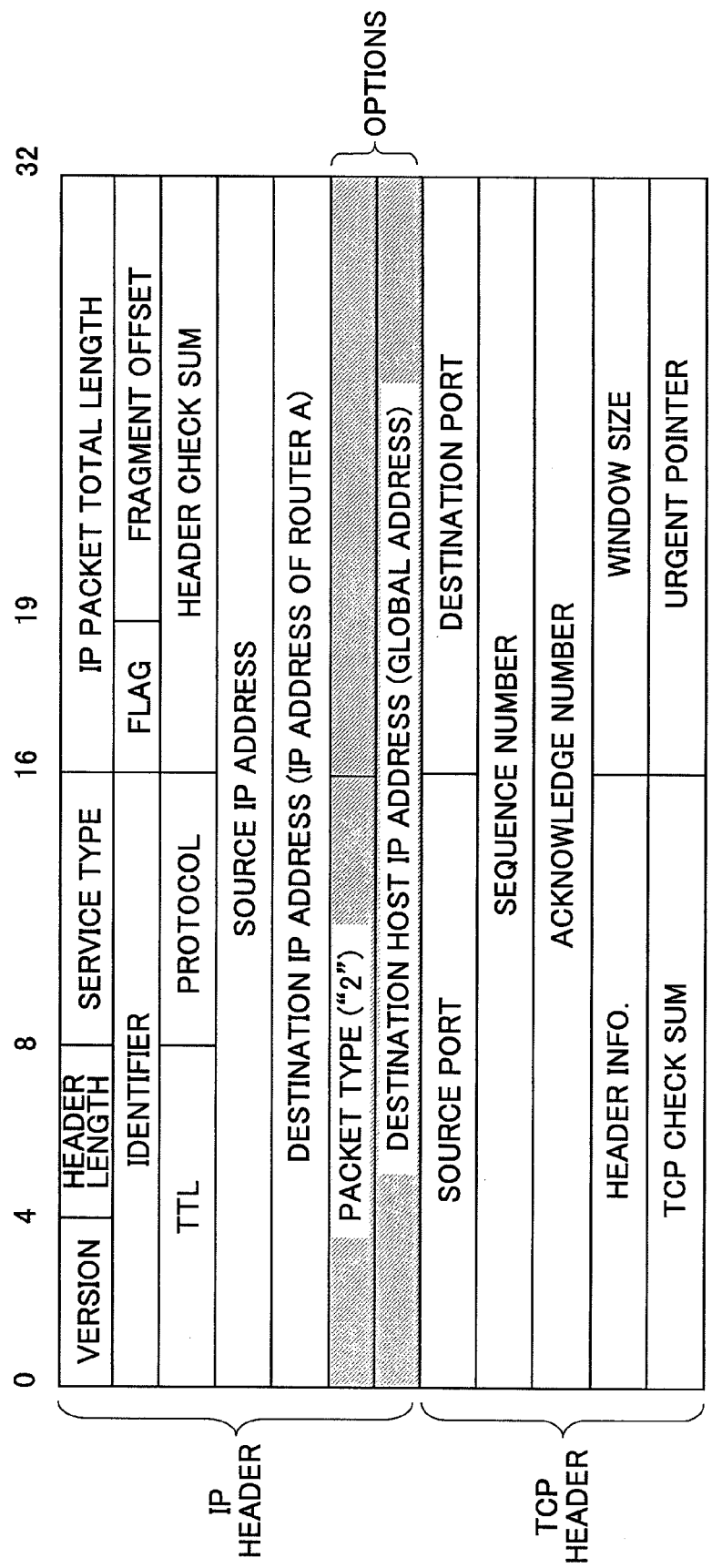
FIG. 49 is a diagram showing an example of IPv4 header and TCP header in which a destination IP address is stored in a destination IP address of IP header and a destination host IP address is stored in an option part of IP header.

When transmitting a default conversion data packet to CE router 100, CE router 300a stores destination host IP addresses (global address etc.) in the IP header option part, as shown in FIG. 49.

CE router 300a stores a destination IP address (IP address of CE router 100) in the destination IP address of IP header, as shown in FIG. 49.

CE router 300a sets up and transmits the packet type of the IP header option part to "2" (which indicates a default conversion data packet), as shown in FIG. 49.

FIG. 49 shows an example of IPv4 header and TCP header in which the destination IP address is stored in the destination IP address of IP header, and the destination host IP address is stored in the IP header option part.

When the default conversion data packet is received from CE router 300a through PE router 200a, CE router 100 detects the destination IP address of the received IP header is the IP address of the router itself and the packet type of the IP header option part is "2" showing a default conversion data packet. CE router 100 operates as follows.

Figure 50:
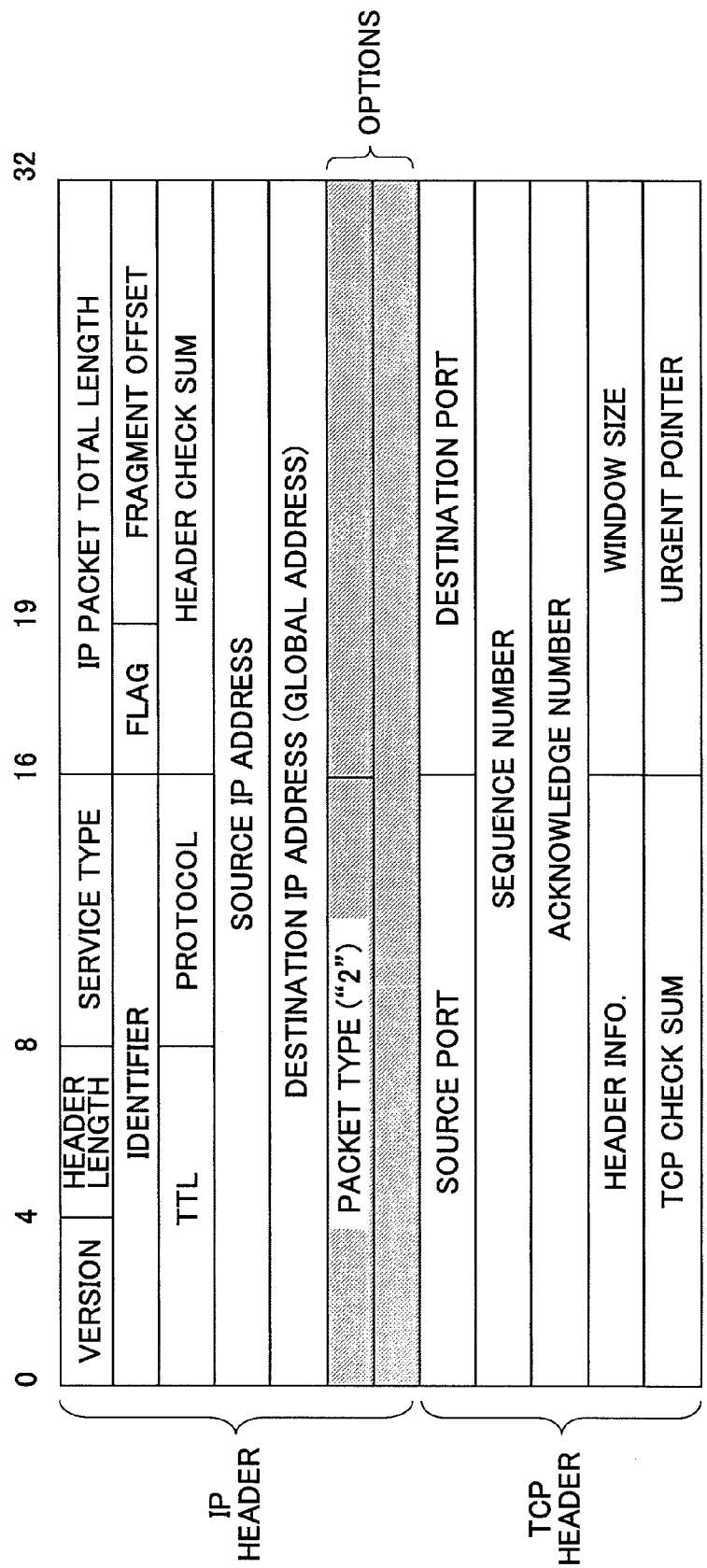
FIG. 50 is a diagram showing an example of IPv4 header and TCP header in which the destination IP address of IP header is rewritten by a destination host IP address stored in the IP header option part.

CE router 100 overwrites the destination host IP addresses (global address etc.) stored in the IP header option part at the destination IP address of IP header, as shown in FIG. 50.

FIG. 50 shows an example of IPv4 header and TCP header in which the destination IP address of IP header is rewritten by the destination host IP address stored in the IP header option part.

CE router 100 transmits the data packet by which the destination IP address was rewritten by destination host IP addresses, such as a global address, to Internet 401 according to routing table 120.

At the time of an error or line failure of PE router 200a, it will change to default route 002 of the 2nd priority, and the path of CE router 300a, CE router 300b, and CE router 100 will be chosen by the function of default route detour management unit 323.

The flowchart for explaining operation which performs broadcast of the default route is essentially the same as the above-mentioned flowchart of FIG. 29 and FIG. 30 except receiving time is not handled, and a description thereof will be omitted.

The flowchart for explaining operation which does not perform broadcast of the default route is essentially the same as the above-mentioned flowchart of FIG. 31, and a description thereof will be omitted.

Since the flowchart showing operation which sets up a default route in every segment and a router unit is the same as that of FIG. 32 mentioned above, explanation is omitted.

Figure 33:
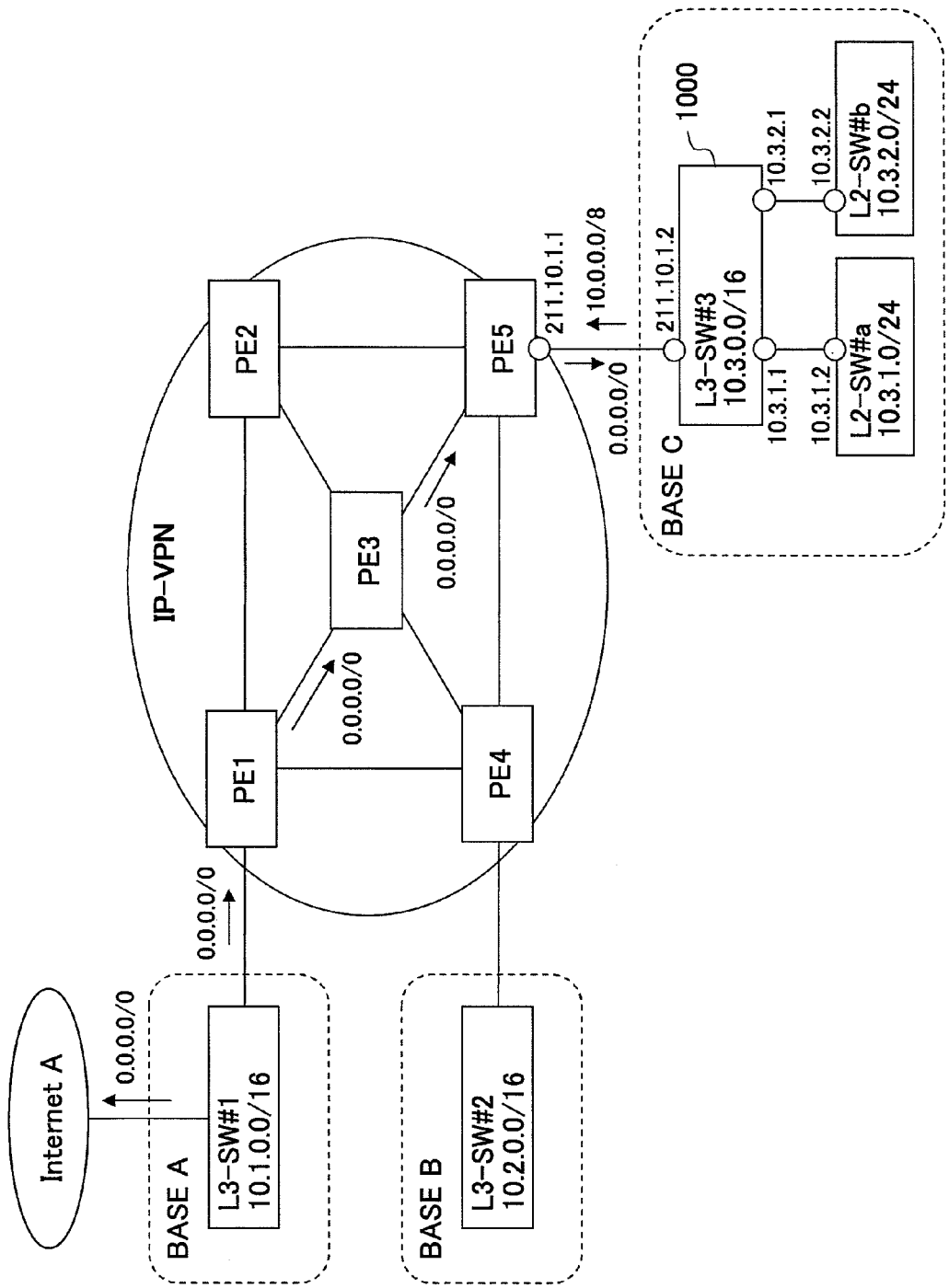
FIG. 33 is a diagram for explaining the procedure of a general routing processing of a base linked to IP-VPN.

Next, a description will be given of a routing processing performed by the network system. FIG. 33 is a diagram showing the procedure the general routing processing of the base linked to IP-VPN.

FIG. 34 is a block diagram of an example showing the routing table of the switch (L3-SW#3) of base C.

If switch 1000 is the routing processing to the segment in base C, it will process, for example according to "item 2" of routing table, and "item 3".

If switch 1000 is the routing processing to other bases, such as bases A and B, it will process according to "item 1" of routing table.

If switch 1000 is the routing processing of a global address, it will process according to "item 4" of routing table. "item 4" of routing table expresses the default route.

Figure 35:
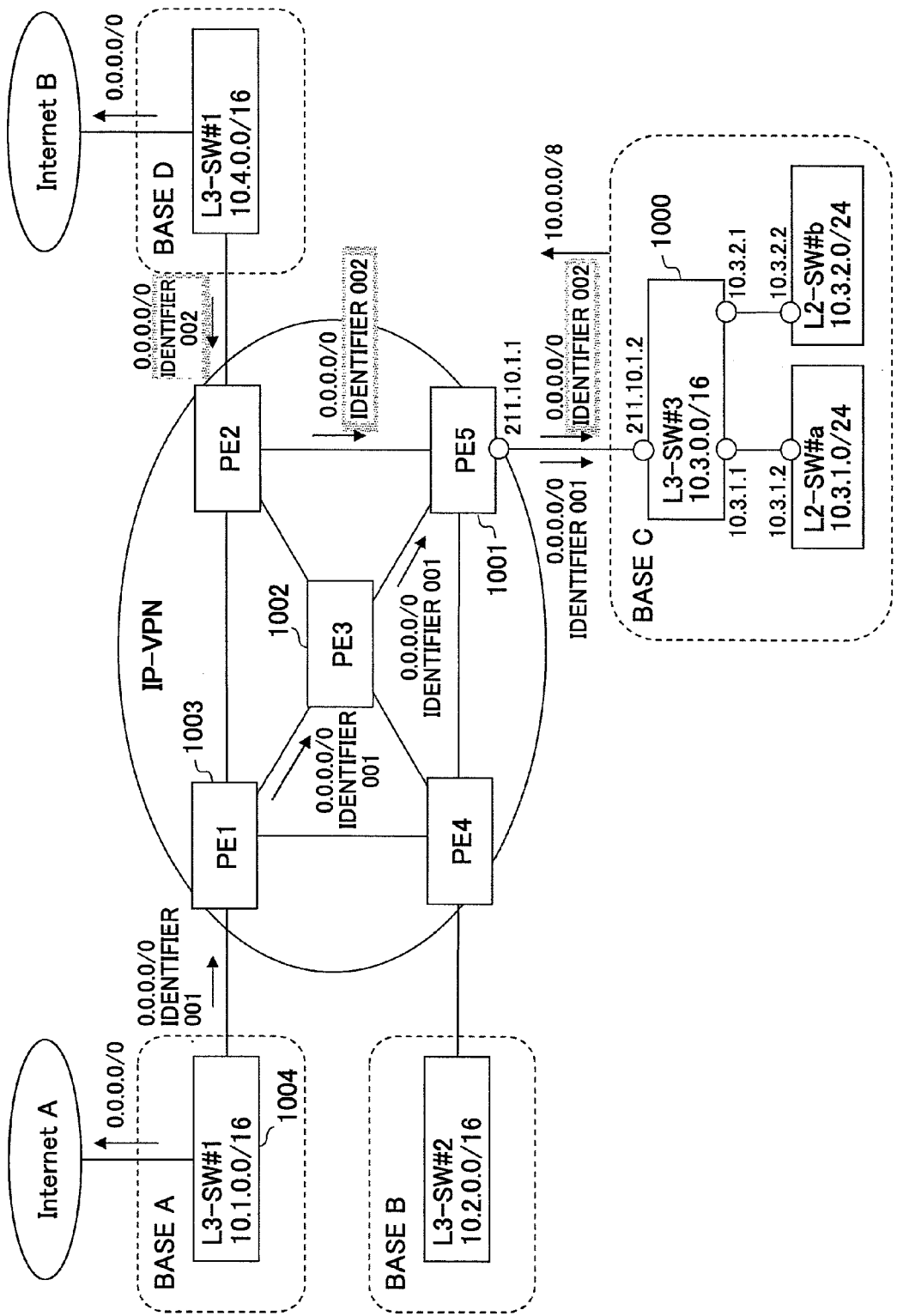
FIG. 35 is a diagram for explaining the procedure of a routing processing according to an embodiment of the invention of a base linked to IP-VPN.

FIG. 35 is a diagram showing the procedure the routing processing by the invention of the base linked to IP-VPN. FIG. 36 shows an example of the information which is managed by the default route management unit of the switch (L3-SW#3) of base C. FIG. 37 shows an example of a routing table of the switch (L3-SW#3) of base C.

If switch 1000 is the routing processing to the segment in base C, it will process, for example according to "item 2" of routing table, and "item 3".

If switch 1000 is the routing processing to other bases, such as base A, B, and D, it will process according to "item 1" of routing table.

If switch 1000 is the routing processing of a global address, it will read the identifier corresponding to the segment which sent out the packet from the information of FIG. 36, and will process according to the item of the routing table of FIG. 37 according to the identifier.

For example, if it is a segment "10.3.1.0/24", switch 1000 will read the identifier "001" from the information of FIG. 36, and will process according to "item 4" of the routing table of FIG. 37 according to the identifier "001".

Figure 38:
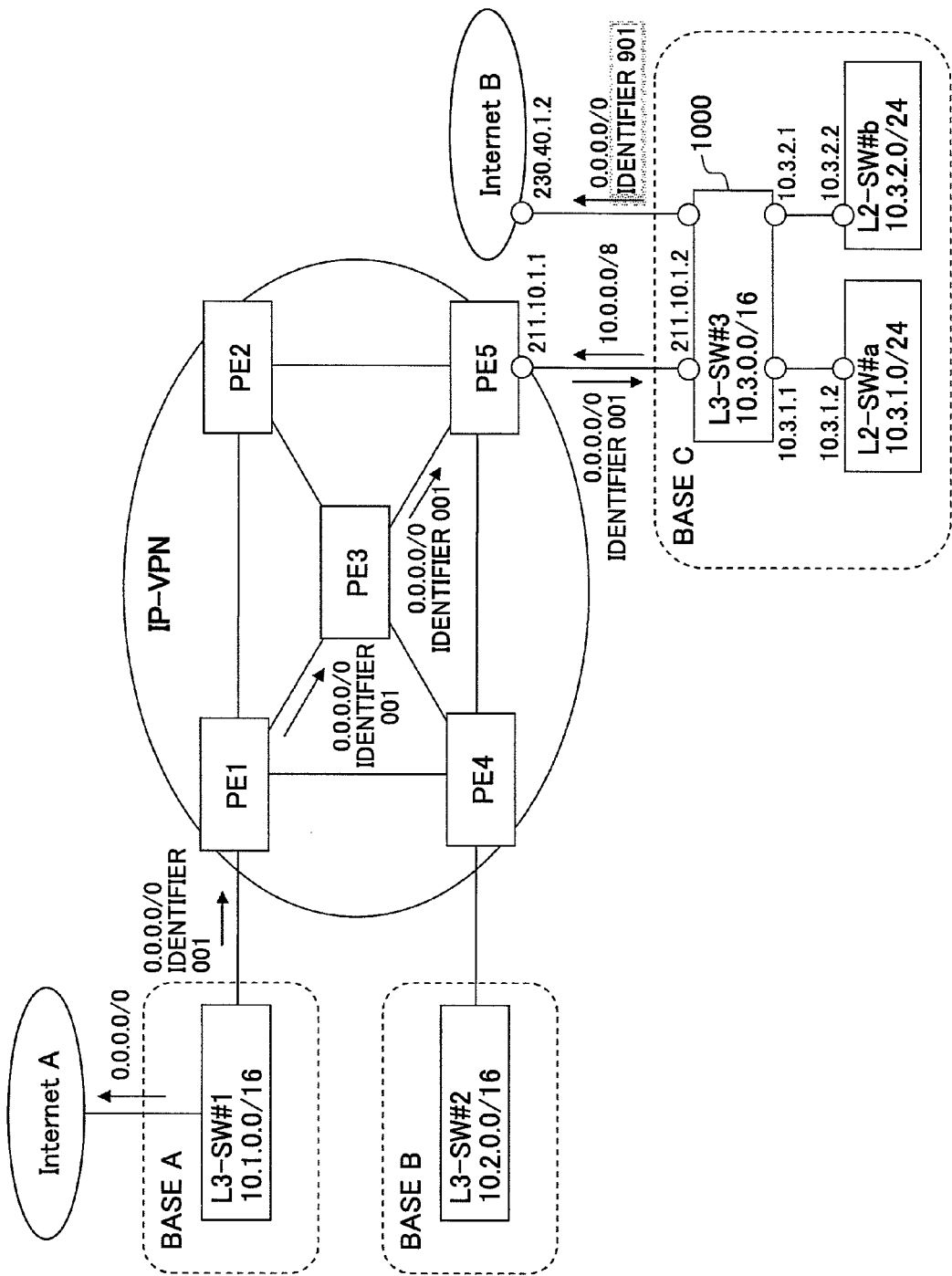
FIG. 38 is a diagram showing the procedure of a routing processing according to an embodiment of the invention of a base linked to IP-VPN.

FIG. 38 is a diagram showing the procedure of a routing processing according to an embodiment of the invention of a base linked to IP-VPN. FIG. 39 shows an example of the information which is managed by the default route management unit of the switch (L3-SW#3) of base C. FIG. 40 shows an example of a routing table of the switch (L3-SW#3) of base C.

If switch 1000 is the routing processing to the segment in base C, it will process, for example according to "item 2" of routing table, and "item 3".

If switch 1000 is the routing processing to other bases, such as bases A and B, it will process according to "item 1" of routing table.

If switch 1000 is the routing processing of a global address, it will read the identifier corresponding to the segment which sent out the packet from the information of FIG. 39, and will process according to the item of the routing table of FIG. 40 according to the identifier.

For example, if it is a segment "10.3.2.0/24", switch 1000 reads the identifier "901" from the information of FIG. 39, and performs the processing according to "item 5" of the routing table of FIG. 40 corresponding to the identifier "901".

Next, the data flow in the routing processing of FIG. 35 will be described. In the following, an example of the communication from a PC (personal computer) connected to the switch (L2-SW#a) of base C to a global address "230.50.10.10" will be described.

To perform the routing processing to a global address, switch 100 reads identifier "001" from "item 4" of the routing table of FIG. 37. Next, switch 1000 determines whether there is any association of transmitting segment "10.3.1.0/24" and identifier "001" in the information of FIG. 36.

Since there is an association of transmitting segment "10.3.1.0/24" and identifier "001", switch 1000 performs the processing according to "item 4" of the routing table of FIG. 37 corresponding to the identifier "001". At this time, switch 1000 stores the identifier "001" into the IP header option part of the transmitting packet. And switch 1000 transmits the transmitting packet to PE router 1001 expressed by "next hop 211.10.1.1".

PE router 1001 checks the IP header option part of the transmitting packet received from switch 1000. Since the identifier "001" is contained in the IP header option part of the transmitting packet, PE router 1001 processes according to the information and the routing table managed by the default route management unit.

Suppose that PE router 1001 has transmitted the transmitting packet to PE router 1002. PE router 1002 checks the IP header option part of the transmitting packet received from PE router 1001.

Since the identifier "1001" is contained in the IP header option part of the transmitting packet, PE router 1002 processes according to the information and the routing table managed by the default route management unit.

Suppose that PE router 1002 has transmitted the transmitting packet to PE router 1003. PE router 1003 checks the IP header option part of the transmitting packet received from PE router 1002.

Since the identifier "001" is contained in the IP header option part of the transmitting packet, PE router 1003 processes according to the information and the routing table managed by the default route management unit.

Suppose that PE router 1003 has transmitted the transmitting packet to switch 1004. Switch 1004 processes the transmitting packet from PE router 1003 according to the routing table. Specifically, switch 1004 transmits the transmitting packet to Internet A which is a default route.

Next, the data flow in the routing processing of FIG. 38 will be described. In the following, an example of the communication from a PC (personal computer) connected to the switch (L2-SW#b) of base C to a global address "230.50.10.10" will be described.

To perform the routing processing of a global address, switch 1000 reads identifier "001" from "item 4" of the routing table of FIG. 40. Next, switch 1000 determines whether there is any association of transmitting segment "10.3.2.0/24" and identifier "001" in the information of FIG. 39.

Since there is no association of transmitting segment "10.3.2.0/24" and identifier "001", switch 1000 reads identifier "901" from "item 5" of the routing table of FIG. 40.

Since there is an association of transmitting segment "10.3.2.0/24" and identifier "901", switch 1000 performs the processing according to "item 5" of the routing table of FIG. 40 corresponding to identifier "901". Specifically, switch 1000 transmits a transmitting packet to Internet B expressed by "next hop 230.40.1.2".

Figure 51:
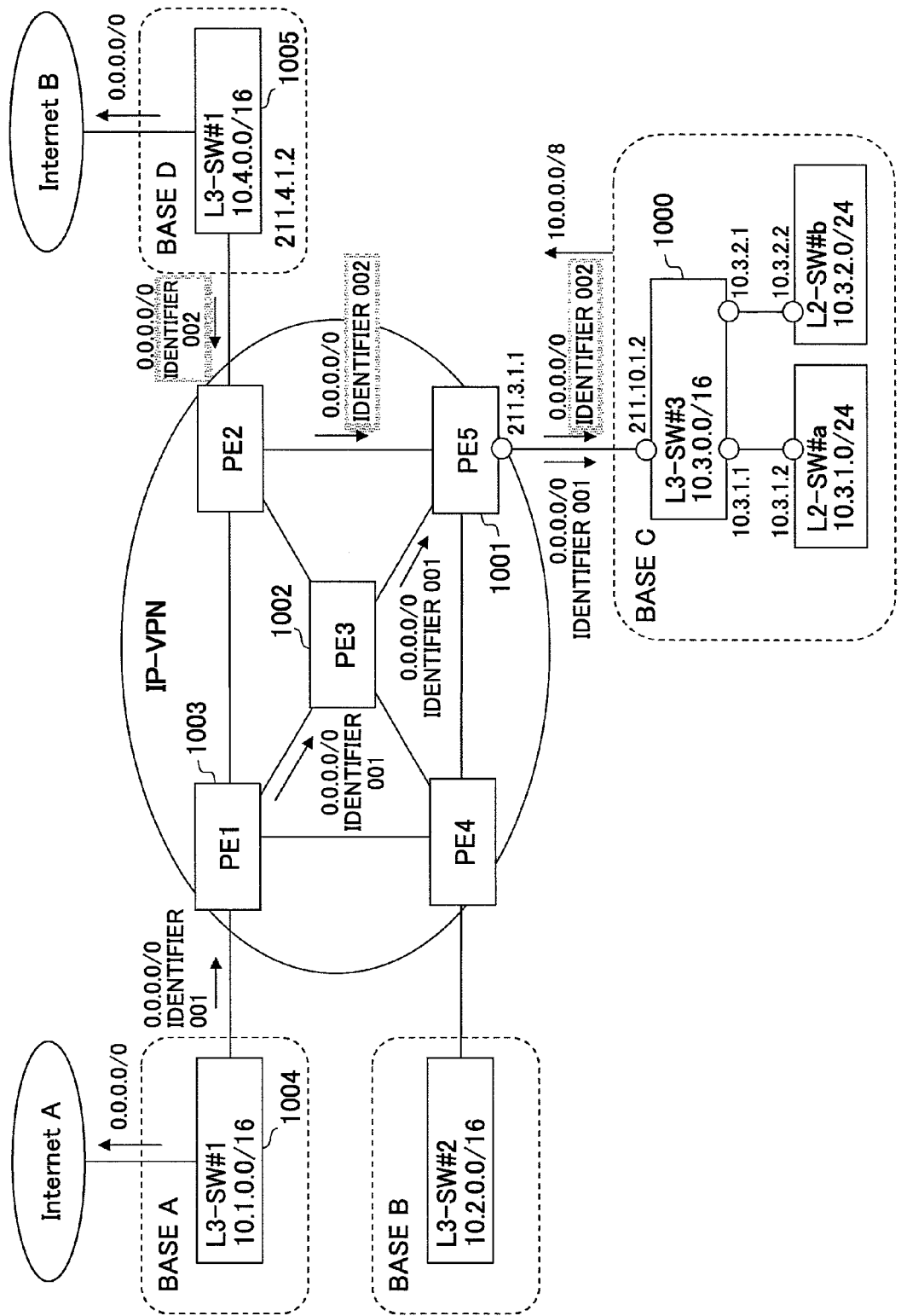
FIG. 51 is a diagram for explaining the procedure of the routing processing according to an embodiment of the invention of a base linked to IP-VPN.

FIG. 51 is a diagram showing the procedure of a routing processing according to an embodiment of the invention of a base linked to IP-VPN. FIG. 52 shows an example of the information which is managed by the default route management unit of the switch (L3-SW#3) of base C. FIG. 53 shows an example of a routing table of the switch (L3-SW#3) of base C.

To perform the routing processing to a segment in base C, switch 1000 performs the processing according to "item 2" and "item 3" of the routing table. To perform the routing processing to other bases, such as bases A, B, and D, switch 100 performs the processing according to "item 1" of the routing table.

To perform the routing processing to a global address, switch 1000 reads an identifier, corresponding to the segment to which the packet is transmitted, from the information of FIG. 52, and performs the processing according to the item of the routing table of FIG. 53 corresponding to the read identifier.

For example, if it is a segment "10.3.1.0/24", switch 1000 reads identifier "001" from the information of FIG. 52 and performs the processing according to "item 4" of the routing table of FIG. 53 corresponding to the identifier "001".

Next, the data flow in the routing processing of FIG. 51 will be described. In the following, an example of the communication from a PC (personal computer) connected to the switch (L2-SW#b) of base C to a global address "230.50.10.10" will be described.

To perform the routing processing to a global address, switch 1000 reads identifier "001" from "item 4" of the routing table of FIG. 53. Next, switch 1000 determines whether there is any association of transmitting segment "10.3.2.0/24" and identifier "001" in the information of FIG. 52.

Since there is no association of transmitting segment "10.3.2.0/24" and identifier "001", switch 1000 reads identifier "002" from "item 5" of the routing table of FIG. 53. Next, switch 1000 determines whether there is any association of transmitting segment "10.3.2.0/24" and identifier "002" in the information of FIG. 52.

Since there is an association of transmitting segment "10.3.2.0/24" and identifier "002", switch 1000 processes according to "item 5" of the routing table of FIG. 53 corresponding to the identifier "002". At this time, switch 1000 stores the destination host IP address "230.50.10.10" into the IP header option part. And switch 1000 stores the destination IP address "211.4.1.2" into the destination IP address of IP header. Moreover, switch 1000 sets the packet type of the IP header option part to "2" which indicates a default conversion data packet, and transmits the packet. And the transmitting packet is transmitted from switch 1000 to switch 1005 expressed by "next hop 211.4.1.2".

The routing processing is performed so that the transmitting packet is sent to the destination "211.4.1.2" within IP-VPN. When the transmitting packet is received at switch 1005, switch 1005 detects that the destination IP address of the IP header is the IP address of the switch itself and the packet type of the IP header option part is "2" which expresses a default conversion data packet. Then switch 1005 operates as follows.

Switch 1005 overwrites the destination host IP address "230.50.10.10" stored in the IP header option part to the destination IP address of the IP header. Switch 1005 transmits the transmitting packet in which the destination IP address is rewritten by the destination host IP address "230.50.10.10", which is a global address, to Internet B according to the routing table 120. Specifically, switch 1005 transmits the transmitting packet to Internet B which is a default route.

The present invention is not limited to the above-described embodiments, and variations and modifications may be made without departing from the scope of the present invention.

What is claimed is:

1. A network system including a plurality of network connection devices in a network, each network connection device comprising:
   a unit configured to associate, when a destination of a received packet does not exist in a routing table, a default route indicating a destination to which the received packet is transmitted, with an identifier that uniquely identifies the default route within the network; and
   a unit configured to set one or more default routes within the network by the association,
   wherein, when a broadcast of a new default route from one of the plurality of network connection devices to other network connection devices within the network has to be performed, said one of the plurality of network connection devices generates a new identifier that uniquely identifies the new default route within the network, and transmits the new default route and the new identifier to the other network connection devices, and wherein said one of the plurality of network connection devices stores a packet type, indicating whether a transmitting packet is a data packet to transmit data or a default route information packet to notify the new default route and the new identifier to the other network connection devices, into a header of the transmitting packet, and transmits the transmitting packet.

2. The network system according to claim 1, wherein one of the plurality of network connection devices determines, when a new default route is received from the other network connection devices in the network, whether an identifier associated with the new default route is already set in the routing table, and wherein, when the identifier is already set in the routing table, the new default route is not incorporated in the routing table.

3. The network system according to claim 1, wherein, when the broadcast of the new default route from the one of the plurality of network connection devices to the other network connection devices in the network has not to be performed, said one of the plurality of network connection devices generates an identifier that uniquely identifies the new default route within said one of the plurality of network connection devices.

4. The network system according to claim 1, wherein each network connection device stores, when the destination of the received packet does not exist in the routing table, the identifier into the received packet, and transmits the received packet according to the default route.

5. The network system according to claim 1, wherein each network connection device reads out, when the destination of the received packet does not exist in the routing table, the identifier contained in the received packet, and transmits the received packet according to the default route associated with the read identifier.

6. The network system according to claim 1, wherein each network connection device is configured to set one or more default routes associated with one or more identifiers for every router or every segment.

7. The network system according to claim 6, wherein each network connection device is configured to assign, when setting the one or more default routes for every router or every segment, a priority level to each default route, and determine bypassing to a default route with a second highest priority level when use of a default route with a highest priority level is impossible.

8. A network connection device in a network, comprising:
a unit configured to associate, when a destination of a received packet does not exist in a routing table, a default route indicating a destination to which the received packet is transmitted, with an identifier that uniquely identifies the default route within the network;
a unit configured to set one or more default routes within the network by the association;
an identifier generation unit configured to generate, when a broadcast of a new default route from the network connection device to other network connection devices within the network has to be performed, a new identifier that uniquely identifies the new default route within the network; and
a default-route information transmitting unit configured to transmit the new default route and the new identifier to the other network connection devices,
wherein the default-route information transmitting unit stores a packet type, indicating whether a transmitting packet is a data packet to transmit data or a default route information packet to notify the new default route and the new identifier to the other network connection devices, into a header of the transmitting packet, and transmits the transmitting packet.

9. The network connection device according to claim 8, further comprising:
a default-route information receiving unit configured to receive a new default route from the other network connection devices in the network; and
a determination unit configured to determine whether an identifier associated with the new default route is already set in the routing table, and, when the identifier is already set in the routing table, the determination unit does not incorporate the new default route in the routing table.

10. The network connection device according to claim 8, wherein, when the broadcast of the new default route from the network connection device to the other network connection devices in the network has not to be performed, the identifier generation unit generates an identifier that uniquely identifies the new default route within the network connection device.

11. The network connection device according to claim 8, wherein, when the destination of the received packet does not exist in the routing table, the identifier is stored into the received packet and the received packet is transmitted according to the default route.

12. The network connection device according to claim 8, wherein, when the destination of the received packet does not exist in the routing table, the identifier contained in the received packet is read out and the received packet is transmitted to the default route associated with the read identifier.

13. The network connection device according to claim 8, wherein the network connection device is configured to set one or more default routes associated with one or more identifiers for every router or every segment.

14. The network connection device according to claim 8, further comprising a default-route detour management unit configured to assign, when setting one or more default routes for every router or every segment, a priority level to each default route, and determine bypassing to a default route with a second highest priority level when use of a default route with a highest priority level is impossible.

15. The network connection device according to claim 8, further comprising:
the routing table in which one or more default routes which are associated with one or more identifiers are set; and
a default-route management unit in which one or more identifiers and one or more transmitting sources which are expected to transmit the received packet are associated,
wherein, when the destination of the received packet does not exist in the routing table, an identifier associated with a transmitting source of the received packet is read out, and the received packet is transmitted to a default route which is associated with the read identifier.

16. The network connection device according to claim 8, wherein the identifier is stored in an IP header option part of the received packet.

17. A network system including a plurality of network connection devices located at edges of a network, each network connection device comprising:
a unit configured to associate, when a destination of a received packet does not exist in a routing table, a default route indicating a destination to which the received packet is transmitted, with an identifier that uniquely identifies the default route within the network; and
a unit configured to set one or more default routes within the network by the association,
wherein, when a broadcast of a new default route from one of the plurality of network connection devices to other network connection devices located at the edges of the network has to be performed, said one of the plurality of network connection devices generates a new identifier that uniquely identifies the new default route within the network, and transmits the new default route and the new identifier to the other network connection devices, and wherein said one of the plurality of network connection devices stores a packet type, indicating whether a transmitting packet is a default conversion data packet to transmit data to the default route or a default route information packet to notify the new default route and the new identifier to the other network connection devices, into a header of the transmitting packet, and transmits the transmitting packet.

18. The network system according to claim 17, wherein, when the default conversion data packet is transmitted, said one of the plurality of network connection devices stores an original destination of the default conversion data packet into a predetermined position of the default conversion data packet, and rewrites a destination of one of the other network connection devices, associated with the default route, by the destination of the default conversion data packet.

19. The network system according to claim 18, wherein said one of the plurality of network connection devices rewrites, when the default conversion data packet addressed to said one of the plurality of network connection devices is received, the destination of the default conversion data packet by the original destination contained in the predetermined position of the default conversion data packet, and transmits the default conversion data packet.

20. The network system according to claim 17, wherein, when the broadcast of the new default route has not to be performed, said one of the plurality of network connection devices generates an identifier that uniquely identifies the new default route within said one of the plurality of network connection devices.

21. The network system according to claim 17, wherein each network connection device is configured to set one or default routes associated with one or more identifiers for every router or every segment.

22. The network system according to claim 21, wherein each network connection device is configured to assign, when setting the one or more default routes for every router or every segment, a priority level to each default route, and determine bypassing to a default route with a second highest priority level when use of a default route with a highest priority level is impossible.

23. A network connection device which is located at one of edges of a network and comprises:

a unit configured to associate, when a destination of a received packet does not exist in a routing table, a default route indicating a destination to which the received packet is transmitted, with an identifier that uniquely identifies the default route within the network;

a unit configured to set one or more default routes within the network by the association;

an identifier generation unit configured to generate, when a broadcast of a new default route from the network connection device to other network connection devices located at the edges of the network has to be performed, a new identifier that uniquely identifies the new default route within the network; and a default-route information transmitting unit configured to transmit the new default route and the new identifier to the other network connection devices, wherein the default-route information transmitting unit stores a packet type, indicating whether a transmitting packet is a default conversion data packet to transmit data to the default route or a default route information packet to notify the new default route and the new identifier to the other network connection devices, into a header of the transmitting packet, and transmits the transmitting packet.

24. The network connection device according to claim 23, further comprising:

a destination storing unit configured to store, when the default conversion data packet is transmitted, an original destination of the default conversion data packet into a predetermined position of the default conversion data packet; and a destination rewriting unit configured to rewrite a destination of one of the other network connection devices, associated with the default route, by the destination of the default conversion data packet.

25. The network connection device according to claim 24, wherein the destination rewriting unit rewrites, when the default conversion data packet addressed to the network connection device is received, the destination of the default conversion data packet by the original destination contained in the predetermined position of the default conversion data packet.

26. The network connection device according to claim 23, wherein, when the broadcast of the new default route has not to be performed, the identifier generation unit generates an identifier that uniquely identifies the new default route within the network connection device.

27. The network connection device according to claim 23, further comprising a default-route function setting unit configured to set one or default routes associated with one or more identifiers for every router or every segment.

28. The network connection device according to claim 27, wherein the default-route function setting unit assigns, when setting the one or more default routes for every router or every segment, a priority level to each default route, and determines bypassing to a default route with a second highest priority level when use of a default route with a highest priority level is impossible.

* * * * *